(12) United States Patent
Ishimaru et al.

(10) Patent No.: US 11,979,511 B2
(45) Date of Patent: May 7, 2024

(54) TERMINAL DEVICE, TERMINAL DEVICE CONTROL METHOD, AND MEMORY MEDIUM

(71) Applicant: SONY CORPORATION, Tokyo (JP)

(72) Inventors: Mikio Ishimaru, Tokyo (JP); Kenta Endo, Tokyo (JP)

(73) Assignee: Sony Group Corporation, Tokyo (JP)

(*) Notice: Subject to any disclaimer, the term of this patent is extended or adjusted under 35 U.S.C. 154(b) by 452 days.

(21) Appl. No.: 17/268,774

(22) PCT Filed: Aug. 2, 2019

(86) PCT No.: PCT/JP2019/030497
§ 371 (c)(1),
(2) Date: Feb. 16, 2021

(87) PCT Pub. No.: WO2020/049921
PCT Pub. Date: Mar. 12, 2020

(65) Prior Publication Data
US 2021/0185160 A1     Jun. 17, 2021

(30) Foreign Application Priority Data
Sep. 7, 2018 (JP) .................. 2018-168353

(51) Int. Cl.
*G06F 3/16* (2006.01)
*G06F 21/32* (2013.01)
(Continued)

(52) U.S. Cl.
CPC .............. *H04M 1/271* (2013.01); *G06F 3/16* (2013.01); *G06F 21/32* (2013.01); *G06V 40/165* (2022.01);
(Continued)

(58) Field of Classification Search
CPC ............ H04M 1/271; H04M 1/724631; G06V 40/165; G06V 40/172; G06V 40/174; G06F 3/13; G06F 21/32
See application file for complete search history.

(56) References Cited

U.S. PATENT DOCUMENTS 9,305,207 B2    4/2016  Chen
2009/0083847 A1    3/2009  Fadell et al.
(Continued)

FOREIGN PATENT DOCUMENTS

CN    104571529 A    4/2015
CN    107767137 A    3/2018
(Continued)

OTHER PUBLICATIONS

International Search Report prepared by the Japan Patent Office dated Sep. 12, 2019, for International Application No. PCT/JP2019/030497.

*Primary Examiner* — Jinsong Hu
*Assistant Examiner* — Farideh Madani
(74) *Attorney, Agent, or Firm* — Sheridan Ross PC

(57) ABSTRACT

A terminal device according to an embodiment includes: a microphone; a communication unit that performs communication via a network; a first sensor that obtains depth information; a first face detecting unit that detects a face and the distance to the face based on the depth information; and a processor. When a communication program, which is meant for making the processor perform transmission and reception of messages including voice messages and which has a sound input mode for enabling collection of sounds using the microphone and transmission of voice messages based on the collected sounds, is executed, and when a message is received by the communication unit under the control of the communication program being executed; the processor performs first-type face detection using the first (Continued)

face detecting unit and controls turning ON and turning OFF the sound input mode according to the result of the first-type face detection.

20 Claims, 21 Drawing Sheets

(51) Int. Cl.
G06V 40/16 (2022.01)
H04M 1/27 (2006.01)
H04M 1/72463 (2021.01)

(52) U.S. Cl.
CPC .......... *G06V 40/172* (2022.01); *G06V 40/176* (2022.01); *H04M 1/724631* (2022.02)

(56) References Cited

U.S. PATENT DOCUMENTS

| | | | |
|---|---|---|---|
| 2010/0093402 A1* | 4/2010 | Jeon | G06F 1/1698 345/158 |
| 2013/0336548 A1 | 12/2013 | Chen | |
| 2014/0169641 A1 | 6/2014 | Lee | |
| 2014/0191948 A1 | 7/2014 | Kim | |
| 2015/0033130 A1* | 1/2015 | Scheessele | G06F 3/013 715/728 |
| 2015/0262005 A1* | 9/2015 | Ohmura | G06F 3/165 348/77 |
| 2015/0281671 A1* | 10/2015 | Bloom | G01B 11/2527 348/46 |
| 2016/0260436 A1 | 9/2016 | Lemay et al. | |
| 2017/0238144 A1 | 8/2017 | Chatani et al. | |
| 2017/0336848 A1 | 11/2017 | Aoyama et al. | |
| 2018/0137862 A1 | 5/2018 | Park | |
| 2018/0159809 A1* | 6/2018 | Xie | H04L 51/224 |

FOREIGN PATENT DOCUMENTS

| | | |
|---|---|---|
| JP | 2000-187499 | 7/2000 |
| JP | 2003-044089 | 2/2003 |
| JP | 2010-541046 | 12/2010 |
| JP | 2015-514254 | 5/2015 |
| JP | 2017-207891 | 11/2017 |
| JP | 2018-505491 | 2/2018 |
| WO | WO 2016/067765 | 5/2016 |

* cited by examiner

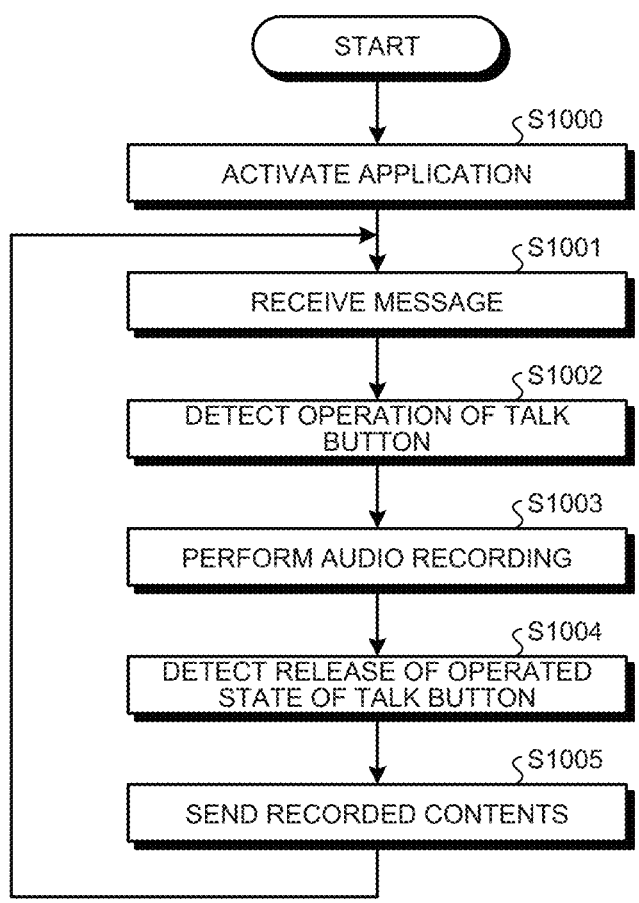

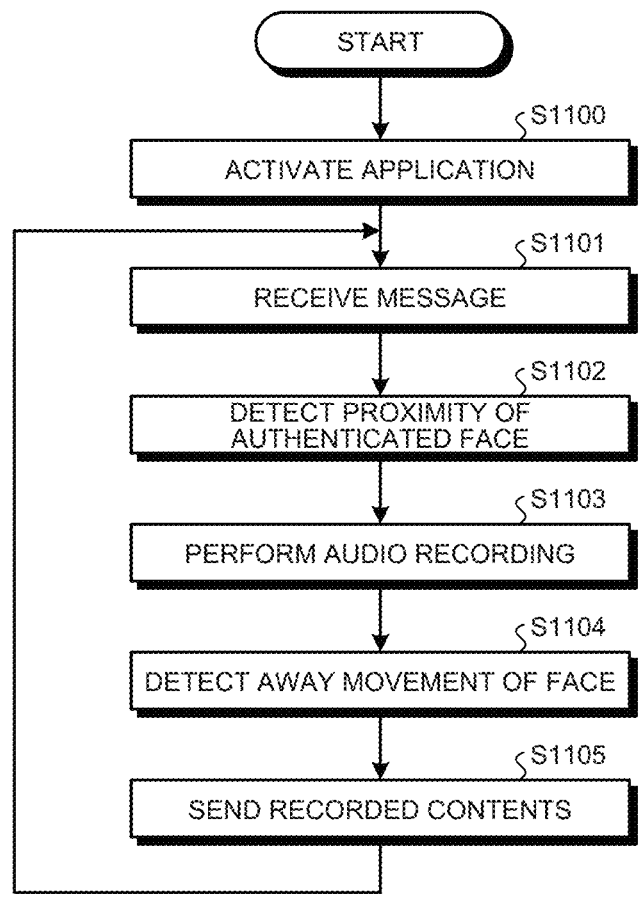

TERMINAL DEVICE, TERMINAL DEVICE CONTROL METHOD, AND MEMORY MEDIUM

CROSS REFERENCE TO RELATED APPLICATIONS

This application is a national stage application under 35 U.S.C. 371 and claims the benefit of PCT Application No. PCT/JP2019/030497 having an international filing date of 2 Aug. 2019, which designated the United States, which PCT application claimed the benefit of Japanese Patent Application No. 2018-168353 filed 7 Sep. 2018, the entire disclosures of each of which are incorporated herein by reference.

FIELD

The application concerned is related to a terminal device, a terminal device control method, and a memory medium.

BACKGROUND

Devices that are capable of performing wireless communication and that are configured to be easily portable (called mobile devices), such as multifunctional cellular phone terminals (smartphones) and tablet computers, are in widespread use. Generally, such mobile devices are equipped to perform communication of voice messages using the telephone function or using the Internet-based voice communication. In the following explanation, such functions of performing communication of voice messages are collectively referred to as the voice communication function. In the case of using the voice communication function in a mobile device, a touch-sensitive panel needs to be tapped for one or more times. Hence, for example, if a person is holding some other things in hands, a situation may often arise when the tapping operation is felt cumbersome.

For that reason, regarding smartphones, various operation methods have been proposed to activate predetermined functions in a contactless manner without performing the tapping operation. For example, in Patent Literature 1 is disclosed a configuration in which a plurality of sensors is used in combination and the device is operated in response to the actions and the utterances of the user. Moreover, in Patent Literature 2 is disclosed a configuration in which the operation mode of a mobile device is decided according to the orientation of the mobile device.

CITATION LIST

Patent Literature

Patent Literature 1: Japanese Patent Application Laid-open No. 2017-215970
Patent Literature 2: Japanese Translation of PCT International Application Publication No. 2012-508530

SUMMARY

Technical Problem

However, in the conventional contactless operation methods, attention is not given to security. For example, when there is an incoming call based on the voice communication function in the mobile device of a user, there is a risk that the incoming call gets answered in response to a predetermined action performed by some other person present near the concerned user.

It is an objective of the application concerned to provide a terminal device, a terminal device control method, and a memory medium that enable contactless activation of the voice communication function only by a specific user.

Solution to Problem

For solving the problem described above, a terminal device according to one aspect of the present disclosure has a microphone; a communication unit that performs communication via a network; a first sensor that obtains depth information; a first face detecting unit that performs first-type face detection for detecting a face and distance to the face based on the depth information; and a processor, wherein when a communication program, which is meant for making the processor perform transmission and reception of messages including voice messages and which has a sound input mode for enabling collection of sounds using the microphone and transmission of voice messages based on the collected sounds, is executed, and when a message is received by the communication unit under control of the communication program being executed, the processor performs the first-type face detection using the first face detecting unit and controls turning ON and turning OFF the sound input mode according to result of the first-type face detection.

BRIEF DESCRIPTION OF DRAWINGS

FIG. 3 is an exemplary flowchart for schematically explaining a sequence of operations performed for voice message transmission according to the existing technology.

FIG. 5 is an exemplary flowchart for schematically explaining a sequence of operations performed for voice message transmission according to a first embodiment.

DESCRIPTION OF EMBODIMENTS

Figure 1:
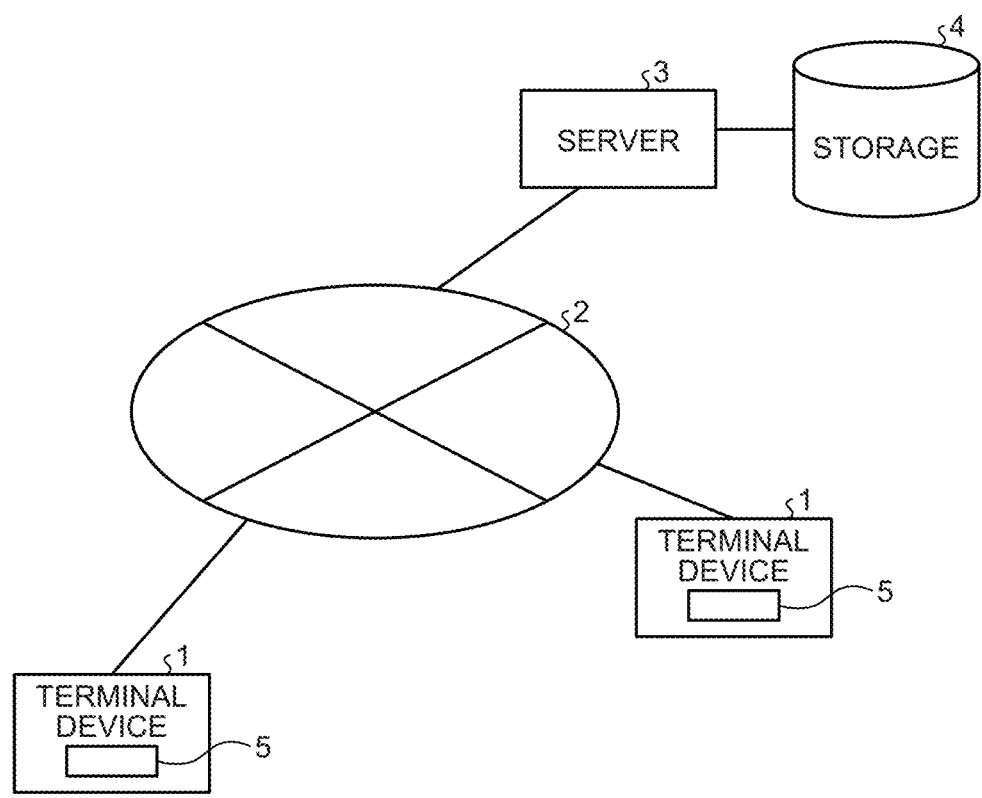
FIG. 1 is a diagram that schematically illustrates an exemplary information processing system applicable in the application concerned.

Preferred embodiments of the application concerned are described below in detail with reference to the accompanying drawings. In the embodiments described below, identical constituent elements are referred to by the same reference numerals, and their explanation is not given repeatedly.

First Embodiment (Information processing system applicable in embodiments) FIG. 1 is a diagram that schematically illustrates an exemplary information processing system applicable in the application concerned. With reference to FIG. 1, a plurality of terminal devices 1 is connected to a server 3 via a network 2 such as the Internet. Moreover, to the server 3, a storage 4 is also connected that represents a high-capacity memory medium configured with a hard disk drive or a flash memory.

Each terminal device 1 is installed with application software 5 (hereinafter, referred to as an SNS application 5) that enables the use of, for example, an SNS (Social Networking Service) provided by the server 3. The SNS provided by the server 3 is, for example, a service enabling transmission and reception of messages, including voice messages, among the terminal devices 1 via the network 2. For example, the user of the terminal device 1 receives the SNS application 5, which is stored in the storage 4, from the server 3; installs it in the terminal device 1; and registers account information in the server 3. With that, the user becomes able to use the SNS, which is provided by the server 3, from the SNS application 5.

The storage 4 can be used to store programs meant for implementing the functions (described later) of the embodiments and their modification examples according to the application concerned. For example, the user can access the server 3 using the terminal device 1; obtain the programs from the storage 4 via the server 3; and install the programs in the terminal device 1.

The terminal device 1 is an information processing device configured to be small in size, light in weight, and easily portable. Examples of the terminal device 1 include a multifunctional cellular phone (smartphone) and a tablet computer. The following explanation is given under the assumption that the terminal device 1 is a smartphone.

Figure 2:
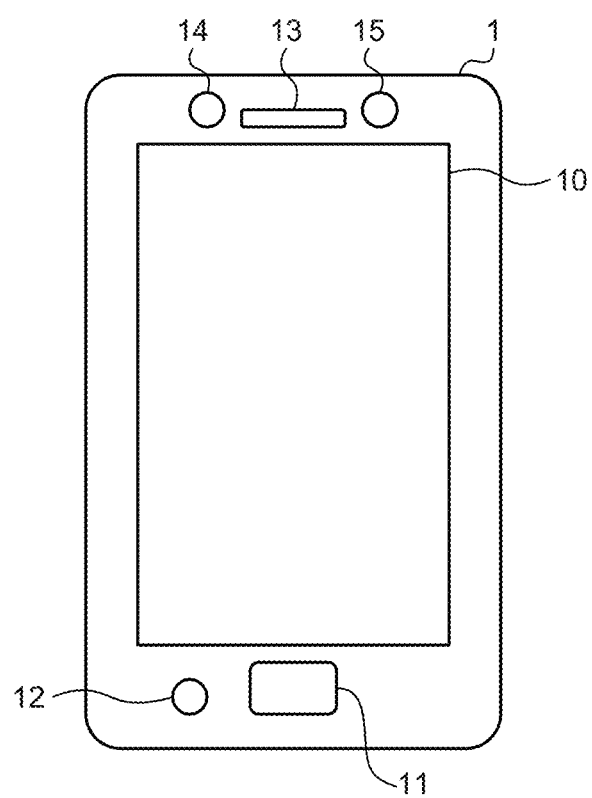
FIG. 2 is a diagram illustrating an exemplary external appearance of a terminal device applicable in embodiments.

FIG. 2 is a diagram illustrating an exemplary external appearance of the terminal device 1 applicable in embodiments. With reference to FIG. 2, the terminal device 1 includes a display unit 10, a home button 11, a microphone 12, a speaker 13, a first sensor 14, and a second sensor 15. The display unit 10 is a touch-sensitive panel in which, for example, a display device and an input device are configured in an integrated manner. Examples of the display device include an LCD (Liquid Crystal Display) and an organic EL (Electro-Luminescence) display. The input device outputs control signals according to the position at which it is touched.

The home button 11 is, for example, a button for receiving user operations meant for controlling the overall operations of the terminal device 1. For example, when the display on the display unit 10 is locked thereby restricting the user operations with respect to the display unit 10, the home button 11 can be operated to release the display lock. The microphone 12 collects, for example, the voice of the user and converts it into voice signals. The speaker 13 converts voice signals into a voice output.

As the first sensor 14, for example, a ranging element is used. In the application concerned, as the first sensor 14, a ToF (Time of Flight) sensor is used that performs ranging based on the difference between an illumination light, which is obtained by irradiation of a laser light, and the reflected light, which is obtained as reflection of the laser light from the ranging target. For example, the user holds the terminal device 1 in such a way that the side on which the first sensor 14 is installed is directed toward his or her face, and the distance (depth) to the parts of the face is measured by the first sensor 14. Then, based on the depth information about the parts of the face as obtained by the first sensor 14 and based on preregistered depth information of the face, the terminal device 1 can perform face authentication of the user.

As the second sensor 15, for example, an image sensor is used that performs imaging and obtains images.

In the information processing system, the user of each terminal device 1 can activate the SNS application 5 in the corresponding terminal device 1, and communicate messages including voice messages with the terminal devices 1 of the other users.

(Voice Message Communication According to Existing Technology)

Prior to the explanation of a first embodiment, the communication performed according to the existing technology is explained in a schematic manner. The following explanation is given with the focus on the example of transmission and reception of voice messages between two terminal devices 1. Herein, the two terminal devices 1 are referred to as a terminal device 1(A) and a terminal device 1(B); and the users of the terminal devices 1(A) and 1(B) are referred to as users A and B, respectively.

FIG. 3 is an exemplary flowchart for schematically explaining a sequence of operations performed for voice message transmission according to the existing technology. For example, the user A activates the SNS application 5 in the terminal device 1(A) (Step S1000). The user B, who has activated the SNS application 5 in the terminal device 1(B) in an identical manner, sends a message having, for example, text data to the terminal device 1(A). That message is received in the terminal device 1(A) (Step S1001).

Figure 4A:
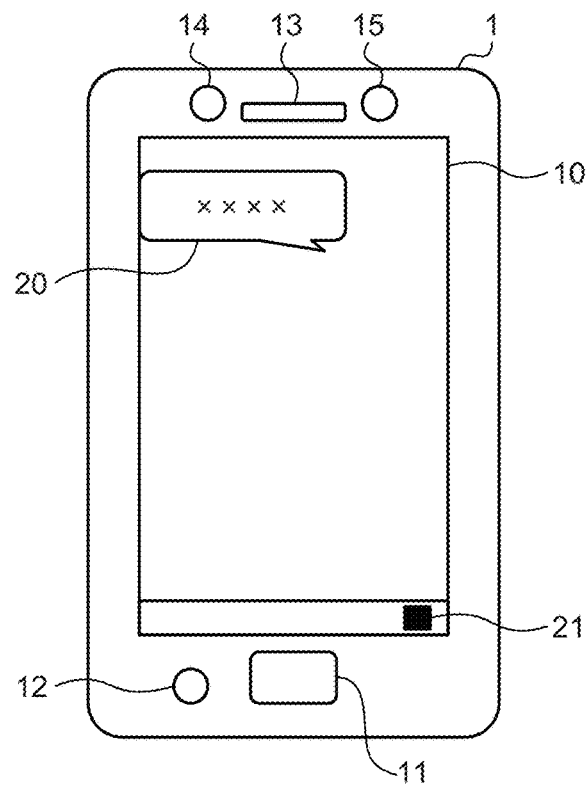
FIG. 4A is a diagram illustrating an example of the display on the display unit of a terminal device in which a message is received.

FIG. 4A is a diagram illustrating an example of the display on the display unit 10 of the terminal device 1(A) in which the message is received. In the display of the display unit 10, for example, the elapse of time is indicated from the top toward the bottom of the screen, and a message 20 that is received is displayed at the upper end of the screen. In the example illustrated in FIG. 4A, a button 21 meant for voice message transmission is displayed at the lower end.

Figure 4B:
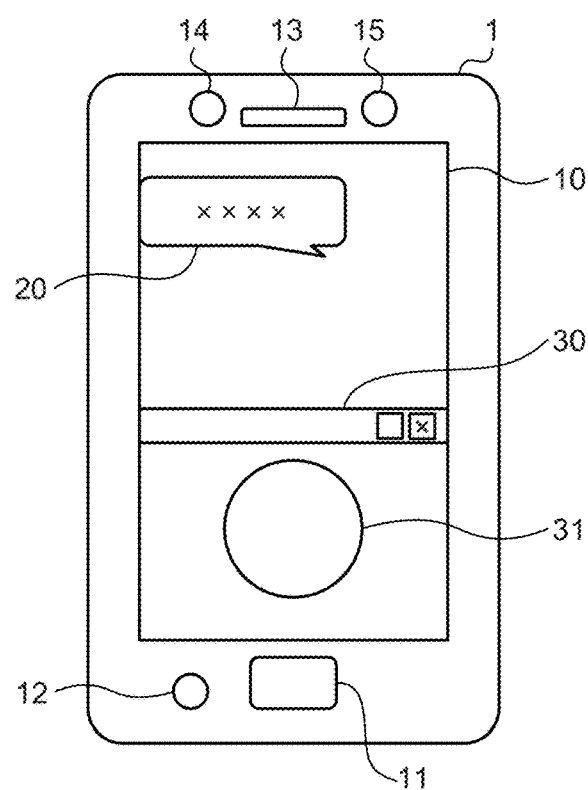
FIG. 4B is a diagram of a screen displayed in the display unit for enabling voice message transmission.

If the user A wishes to reply to the message, which is received at Step S1001, using a voice message; he or she operates (taps) the button 21. In response to the operation of the button 21, the terminal device 1(A) switches the screen of the display unit 10 to a screen meant for voice message transmission. FIG. 4B is a diagram of a screen displayed in the display unit 10 for enabling voice message transmission. In the screen of the display unit 10, a talk area 30 having a talk button 31 gets displayed.

When an operation (for example, tapping) of the talk button 31 is detected (Step S1002), the terminal device 1(A) starts audio recording of the sounds collected by the microphone 12 (Step S1003). The audio recording is continuously performed while the talk button 31 is in the operated state. When it is detected that the talk button 31 is released from the operated state (Step S1004), the terminal device 1(A) ends the audio recording and sends the recorded contents to the terminal device 1(B) (Step S1005).

In this way, in the transmission of a voice message according to the existing technology, the talk button 31 is operated and, while the talk button 31 is in the operated state, the voice to be transmitted gets recorded. Thus, the user A who wishes to send a voice message happens to hold the terminal device 1 in one hand and operate the talk button 31 using the other hand. Hence, for example, when the user A is holding some other thing in one hand, the operation of the terminal device 1 becomes extremely cumbersome.

In the explanation given above, the audio recording is performed while the talk button 31 is in the operated state; and a voice message is sent that is recorded till the point of time of releasing the talk button 31 from the operated state. However, that is not the only possible example. Alternatively, it is also possible to think of a method in which a voice message is sent while the talk button 31 is still in the operated state. However, in that method too, the fact remains that the terminal device 1 is held in one hand and the talk button 31 is operated using the other hand.

(Voice Message Transmission According to First Embodiment)

Given below is the schematic explanation about the voice message transmission performed according to the first embodiment. FIG. 5 is an exemplary flowchart for schematically explaining a sequence of operations performed for voice message transmission according to the first embodiment. In the following explanation, it is assumed that, for example, the user A makes the terminal device 1(A) obtain an image of his or her face using the first sensor 14 and perform face authentication. The information about the authenticated face is stored in the terminal device 1(A).

For example, the user A activates the SNS application 5 in the terminal device 1(A) (Step S1100). The user B, who has activated the SNS application 5 in the terminal device 1(B) in an identical manner, sends a message having, for example, text data to the terminal device 1(A). The message is received in the terminal device 1(A) (Step S1101).

Upon receiving the message, the terminal device 1(A) turns the first sensor 14 toward his or her face and moves it closer to the face. Based on the face detection result obtained by the first sensor 14, the terminal device 1(A) determines whether or not the detected face is an already-authenticated face. If the detected face is determined to be an already-authenticated face (Step S1102), the terminal device 1(A) starts audio recording of the voice collected by the microphone 12 (Step S1103). The audio recording is continuously performed until it is determined based on the detection result of the first sensor 14 that the face has moved away. When it is detected based on the detection result of the first sensor 14 that the face has moved away from the terminal device 1(A) by a predetermined distance or more (Step S1104), the terminal device 1(A) ends the audio recording and sends the recorded contents to the terminal device 1(B) (Step S1105).

In this way, in the first embodiment, only by moving the face close to the terminal device 1(A), a voice message can be set without having to perform any button operation in the terminal device 1(A). Thus, in response to a message from the user B, the user A becomes able to easily send a voice message using only one hand.

In the explanation given above, audio recording is performed while the face is kept close to the terminal device 1(A); and the recorded voice message is sent once the face is moved away from the terminal device 1(A) by a predetermined distance or more. However, that is not the only possible case. Alternatively, it is also possible to think of a method in which a voice message is sent while the face is kept close to the terminal device 1(A). In that case too, the fact remains that a voice message can be easily sent as a response using only one hand.

(More Detailed Explanation of First Embodiment)

Given below is the more detailed explanation of the first embodiment.

(Specific Configuration of Terminal Device According to First Embodiment)

Figure 6:
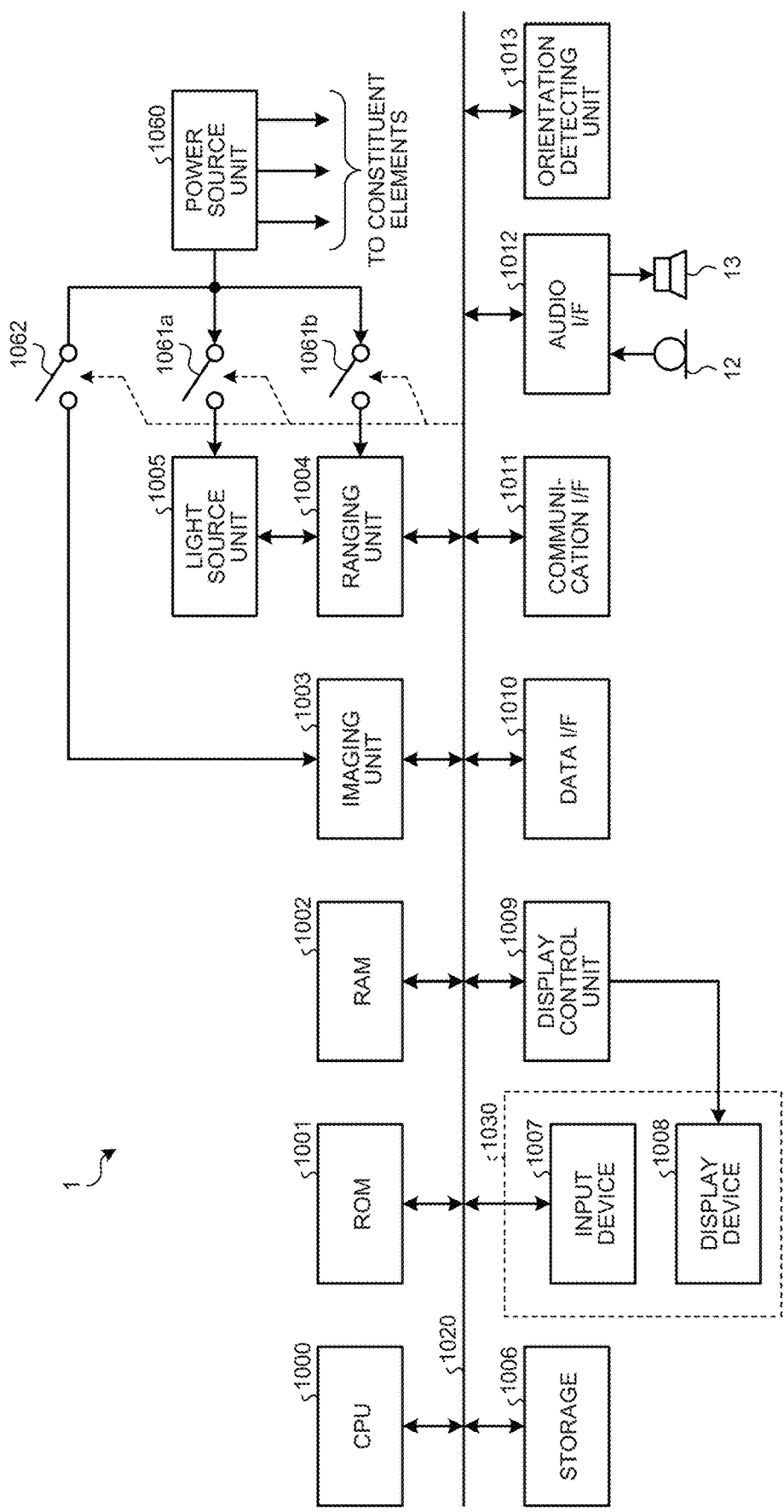
FIG. 6 is an exemplary block diagram illustrating a hardware configuration of the terminal device applicable to the first embodiment.

Firstly, regarding the terminal device 1 according to the first embodiment, the specific explanation is given below. FIG. 6 is an exemplary block diagram illustrating a hardware configuration of the terminal device 1 applicable to the first embodiment. With reference to FIG. 6, the terminal device 1 includes a CPU (Central Processing Unit) 1000, a ROM (Read Only Memory) 1001, a RAM (Random Access Memory) 1002, an imaging unit 1003, a ranging unit 1004, a storage 1006, an input device 1007, a display control unit 1009, a data I/F (interface) 1010, a communication I/F 1011, an audio I/F 1012, and an orientation detecting unit 1013 that are connected to each other by a bus 1020. Moreover, the terminal device 1 includes a power source unit 1060 that supplies power to the constituent elements of the terminal device 1.

To the ranging unit 1004, a light source unit 1005 is connected. The power supply unit 1060 supplies power to the ranging unit 1004 and the light source unit 1005 via switches 1061a and 1061b, respectively. Moreover, the power supply unit 1060 supplies power to the imaging unit 1003 via a switch 1062. The switches 1061a, 1061b, and 1062 switch between the ON state and the OFF state under the control of, for example, the CPU 1000.

The storage 1006 is a nonvolatile memory medium such as a flash memory or a hard disk drive. The CPU 1000 follows instructions written in the programs that are stored in the storage 1006 or the ROM 1001, and controls the overall operations of the terminal device 1 while using the RAM 1002 as the work memory.

The input device 1007 outputs control signals according to user operations. The display control unit 1009 generates display signals, which are displayable by a display device 1008, based on display control signals sent by the CPU 1000. The input device 1007 and the display device 1008 are configured in an integrated manner and function as a touch-sensitive panel 1030.

The data I/F 1010 is an interface for enabling the terminal device 1 to perform data communication with external devices. For example, USB (Universal Serial Bus) or Bluetooth (registered trademark) can be used as the data I/F 1010. The communication I/F 1011 performs communication with the network 2. To the audio I/F 1012 are connected the microphone 12 and the speaker 13. The audio I/F 1012 performs AD (Analog to Digital) conversion of the analog sound signals that are based on the sounds collected by the microphone 12, and output digital sound data. Moreover, the audio I/F 1012 performs DA (Digital to Analog) conversion of sound data received via the bus 1020 into analog sound signals, and sends it to the speaker 13.

The orientation detecting unit 1013 detects the orientation of the terminal device 1. For example, as the orientation detecting unit 1013, it is possible to implement a 9-axis sensor including a gyro sensor (an angular velocity sensor), an acceleration sensor, and a geomagnetic sensor that individually perform detection along the three axes, namely, the x axis, the y axis, and the z axis.

The imaging unit 1003 corresponds to the second sensor 15 and includes: an image sensor that outputs image signals corresponding to the light with which it is irradiated; an optical system that guides the light from the photographic subject to the light receiving surface of the image sensor; and a processing unit that performs predetermined signal processing and predetermined image processing with respect to the image signals output from the image sensor. As the image sensor, it is possible to use a solid-state image sensing device (CIS: CMOS Image Sensor) in which a CMOS (Complementary Metal Oxide Semiconductor) is used.

The solid-state imaging device can be configured by forming an image sensor unit, in which pixels are arranged in an array-like manner, and a processing unit on a single semiconductor chip. Moreover, the solid-state imaging device can have a two-layer structure configured by bonding a layer in which an image sensor is formed and a layer in which a processing unit is formed. However, that is not the only possible case. Alternatively, the solid-state imaging device can have a three-layer structure configured by further bonding a layer in which a memory is formed to the layers in which an image sensor unit and a processing unit are formed.

The ranging unit 1004 and the light source unit 1005 constitute a ToF sensor representing the first sensor 14. Although explained later in detail, the light source unit 1005 includes a light source of, for example, infrared light (IR). The ranging unit 1004 includes a light receiving element that receives the reflected light of the infrared light emitted from the light source unit 1005 onto the target, and includes a signal processing unit that generates point group information in which each point holds depth information based on the output of the light receiving element (distance information along the optical axis direction).

Figure 7:
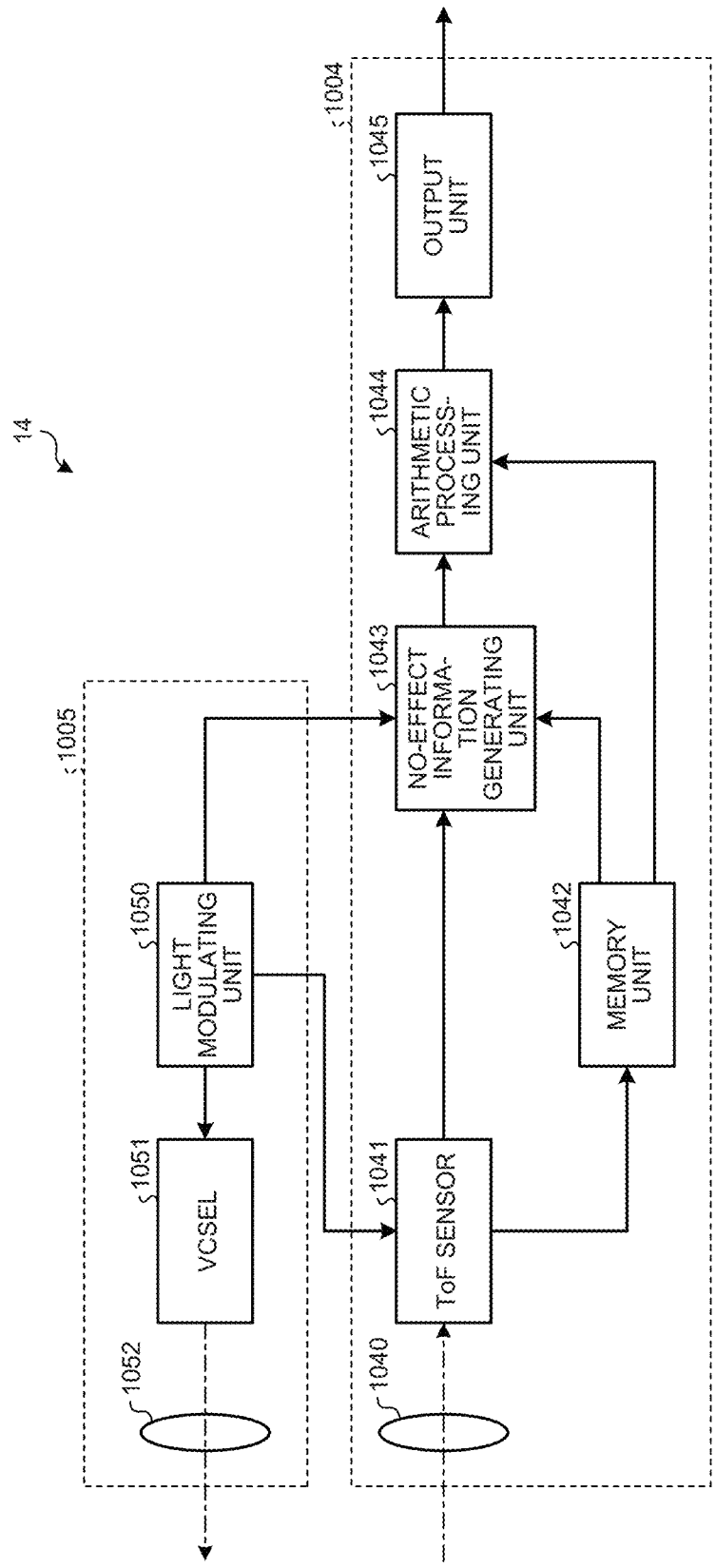
FIG. 7 is a diagram illustrating a more detailed configuration example of a first sensor.

FIG. 7 is a diagram illustrating a more detailed configuration example of the first sensor 14. In the first sensor 14, the light source unit 1005 includes a light modulating unit 1050, a VCSEL (Vertical Cavity-Surface Emitting Laser) 1051, and a projector lens 1052. The ranging unit 1004 includes a light receiving lens 1040, a ToF sensor 1041, a memory unit 1042, a no-effect information generating unit 1043, an arithmetic processing unit 1044, and an output unit 1045.

The light modulating unit 1050 sends the light output from the VCSEL 1051, such as modulation signals to be used in performing modulation at high-frequency waves of about 10 MHz, to the VCSEL 1051. Moreover, the light modulating unit 1050 sends timing signals, which indicate the timings of modulation of the light of the VCSEL 1051, to the ToF sensor 1041 and the no-effect information generating unit 1043.

According to the modulation signals sent by the light modulating unit 1050, the VCSEL 1051 emits light while performing high-speed modulation of the light of the invisible area such as the infrared light; and emits the resultant light onto the target object for distance measurement by the first sensor 14. In the first embodiment, the light source that emits light toward the target object is explained as the VCSEL 1051. However, alternatively, it is possible to use some other light source such as a laser diode.

The projector lens 1052 is configured using a narrow-angle lens for adjusting the distribution of light, so that the light emitted from the VCSEL 1051 has the desired irradiation angle.

The light receiving lens 1040 is configured using a wide-angle lens that covers the light receiving range of the light received by the first sensor 14 for the purpose of distance measurement. The light receiving lens 1040 forms an image of the light, which is collected within the angle of field of the light receiving range, onto the sensor surface of the ToF sensor 1041.

The ToF sensor 1041 is configured using light receiving elements (pixels) having sensitivity in the wavelength area of the light that is emitted from the VCSEL 1051; and receives the light, with which the light receiving lens 1040 has formed an image, using a plurality of light receiving elements arranged in an array-like manner on the sensor surface. For example, the ToF sensor 1041 includes the light receiving elements in about 180×240 number of arrays. The ToF sensor 1041 is disposed near the VCSEL 1051 and receives the light coming from the light receiving range including the irradiation range within which the light is emitted from the VCSEL 1051. Then, the ToF sensor 1041 outputs RAW signals having the amount of light received by each light receiving element as the measured value.

The memory unit 1042 is used to store point group information that is built using the RAW signals output from the ToF sensor 1041. For example, the memory unit 1042 can be used to store the latest point group information obtained when a change occurs in the light receiving range, or can be used to store, as background information, the point group information in the state in which no target object is present in the light receiving range.

The no-effect information generating unit 1043 eliminates, according to the timing signals received from the light modulating unit 1050, the effect of the ambient light from the RAW signals received from the ToF sensor 1041. As a result, the no-effect information generating unit 1043 generates point group information having only the reflected light component corresponding to the light emitted from the VCSEL 1051 as the measured value (hereinafter, called no-effect information); and sends the no-effect information to the arithmetic processing unit 1044. Moreover, the no-effect information generating unit 1043 reads the background information stored in the memory unit 1042; obtains the difference between the background information and the point group information built using the RAW signals received from the ToF sensor 1041; and generates no-effect information confined to the target object in the light receiving range.

Regarding the arithmetic processing unit 1044, every time the no-effect information is received from the no-effect information generating unit 1043, the arithmetic processing unit 1044 performs the calculation for obtaining the distance to the target object from each point in the no-effect information; and sends depth signals, which represent the distances, to the output unit 1045. Moreover, as may be necessary, the arithmetic processing unit 1044 can read the latest point group information stored in the memory unit 1042, and obtain the distances to the target object using that point group information.

The output unit 1045 generates depth information, in which the distances to the photographic subject are lined up according to the arrangement of the light receiving elements, based on the depth signals received from the arithmetic processing unit 1044; and outputs the depth information to the bus 1020.

Meanwhile, in the explanation given above, a VCSEL is used as the light source element in the light source unit 1005. However, that is not the only possible case. Alternatively, for example, an LED (Light Emitting Diode) can be used as the light source element used in the light source unit 1005.

Figure 8:
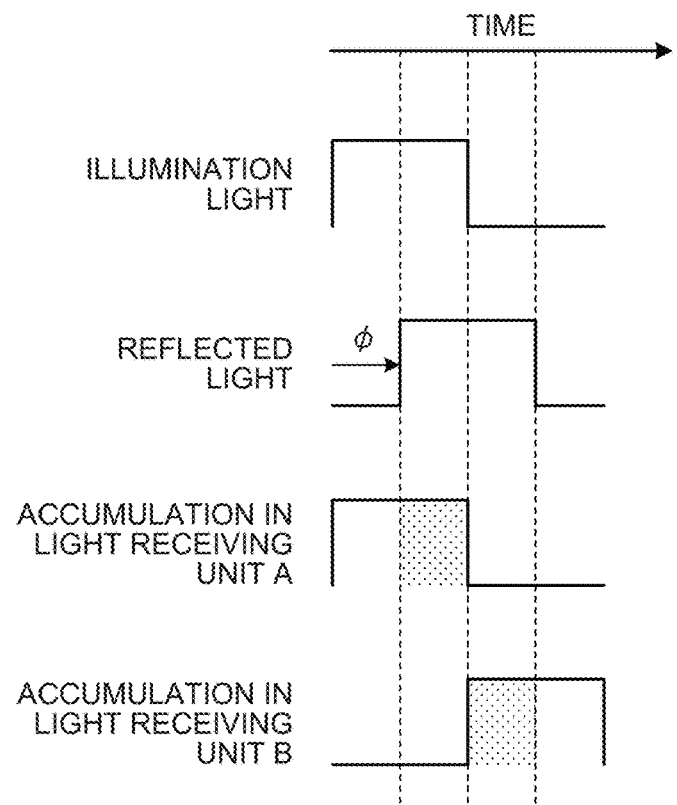
FIG. 8 is a diagram for explaining the principle of distance measurement implemented in the first sensor.

Explained below with reference to FIG. 8 is the principle of distance measurement implemented in the first sensor 14. For example, the VCSEL 1051 emits illumination light toward the target object, and the ToF sensor 1041 receives the reflected light, which is obtained due to the reflection of the illumination light from the target object, with a delay of a time period $\phi$ from the emission timing of the illumination light according to the distance to the target object. At that time, in the ToF sensor 1041, the reflected light is received by a light receiving unit A, which receives light at the same time interval as the time interval at which the VCSEL 1051 emits the illumination light, and by a light receiving unit B, which receives light at that same time interval but starting from the end of light reception by the light receiving unit A. Thus, an electric charge gets accumulated in the light receiving units A and B.

Based on the ratio of the electrical charge accumulated in the light receiving unit A and the electrical charge accumulated in the light receiving unit B, the time period $\phi$ taken till the reception of the reflected light can be obtained; and the distance to the target object can be calculated according to the speed of light. Such a ToF method for calculating the distance to the target object based on the ratio of the electrical charge is called an indirect ToF.

In contrast, the ToF method for calculating the distance to the target object based on the time difference between the illumination light and the reflected light is called a direct ToF. In the application concerned, either one of the indirect ToF and the direct ToF can be implemented.

Figure 9:
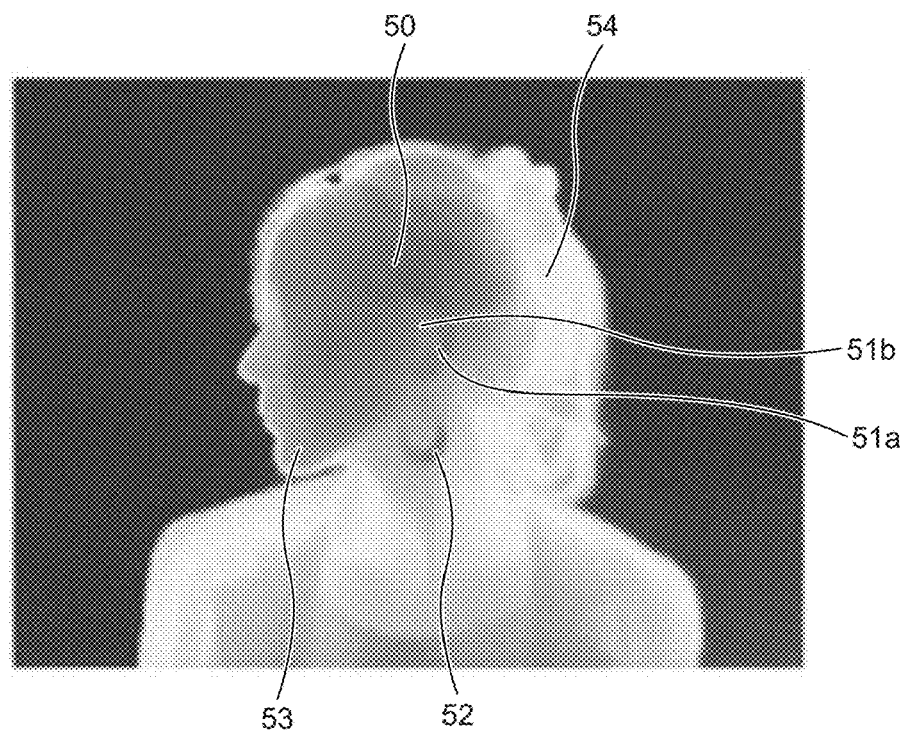
FIG. 9 is a diagram illustrating an example of depth information output by the first sensor according to the first embodiment.

FIG. 9 is a diagram illustrating an example of the depth information output by the first sensor 14 according to the first embodiment. In the example illustrated in FIG. 9, the depth information is expressed in the form of gradation by performing interpolation among the points. In FIG. 9, excluding the background, the portion having a darker shade (black shade) indicates a shorter distance, and the portion having a lighter shade (white shade) indicates a longer distance.

More particularly, regarding the face that is oriented sideways as illustrated in FIG. 9, it can be understood that a temporal region 50, an outer edge 51a of the auricle of ear, and an earing 52 have the darkest shade and are at the shortest distance. Moreover, it can be understood that a jaw 53 has a lighter shade than the temporal region 50 and is farther than the temporal region 50. Furthermore, it can be understood that hair 54 on the back of the head has the lightest shade and is farthest from among the other areas of the face. Moreover, it can be understood that, in the auricle of ear, the outer edge 51a and an inner portion 51b have different levels of darkness, and the inner portion 51b is farther than the outer edge 51a.

In this way, based on the ranging result obtained by the first sensor 14, it becomes possible to obtain the concavo-convex shape of the target object.

Figure 10:
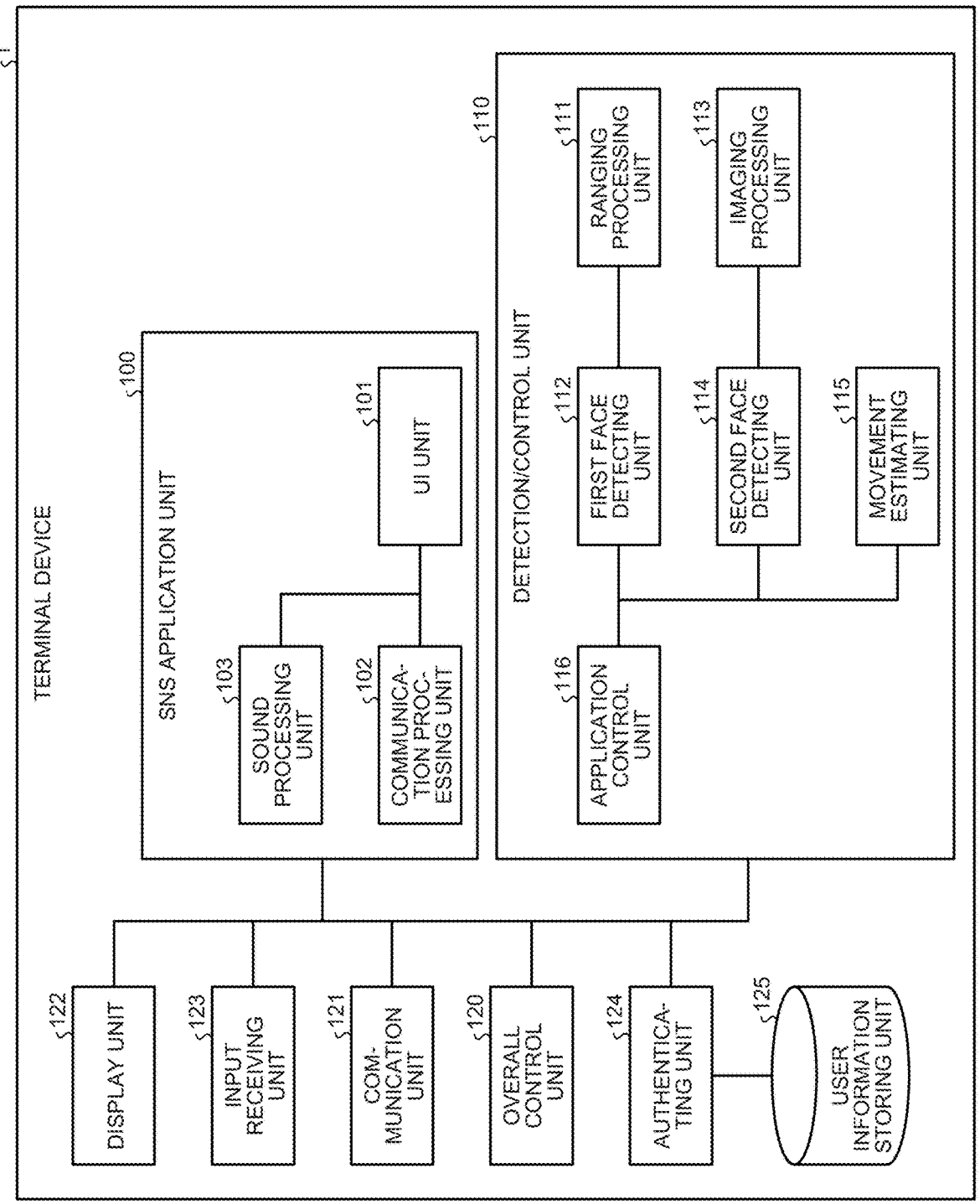
FIG. 10 is an exemplary functional block diagram for explaining the functions of the terminal device according to the first embodiment.

FIG. 10 is an exemplary functional block diagram for explaining the functions of the terminal device 1 according to the first embodiment. With reference to FIG. 10, the terminal device 1 includes an SNS application unit 100, a detection/control unit 110, an overall control unit 120, a communication unit 121, a display unit 122, an input receiving unit 123, an authenticating unit 124, and a user information storing unit 125.

Of those functions, the SNS application unit 100 corresponds to the SNS application 5 provided by the server 3, and is configured in the terminal device 1 as a result of installing an installation program, which is obtained from the server 3, in the terminal device 1. The detection/control unit 110 performs operations according to the first embodiment, and is configured in the terminal device 1 as a result of installing an installation program, which is obtained from the server 3 or another server, in the terminal device 1. However, that is not the only possible case. Alternatively, the installation program for configuring the detection/control unit 110 can be included in the installation program for configuring the SNS application unit 100.

On the other hand, the overall control unit 120, the communication unit 121, the display unit 122, the input receiving unit 123, and the authenticating unit 124 are installed in advance in the terminal device 1. The user information storing unit 125 is configured using, for example, a predetermined area of the storage 1006.

The overall control unit 120 represents, for example, the OS (Operating System) that controls the overall operations of the terminal device 1. The communication unit 121 controls the communication performed via the network 2. The display unit 122 generates display control signals meant for performing display in the display device 1008. The input receiving unit 123 receives user operations with respect to the input device 1007.

The authenticating unit 124 authenticates the user of the terminal device 1 based on the user information stored in the user information storing unit 125. The user information used by the authenticating unit 124 in performing user authentication contains: a user ID; a password; a PIN (Personal Identification Number) code; face information based on the depth information detected by a first face detecting unit 112 (described later); and a taken image detected by a second face detecting unit 114 (described later).

The SNS application unit 100 includes a UI (User Interface) unit 101, a communication processing unit 102, and a sound processing unit 103. The UI unit 101 provides a user interface enabling the user to scan the terminal device 1; and is used to define the configuration of the display screens to be displayed in the display device 1008 by the display unit 122 and to define user operations performed with respect to the input device 1007 and received by the input receiving unit 123. The communication processing unit 102 performs processing related to the communication in the concerned SNS. The sound processing unit 103 performs processing related to the transmission and reception of voice messages in the concerned SNS.

The detection/control unit 110 includes a ranging processing unit 111, the first face detecting unit 112, an imaging processing unit 113, the second face detecting unit 114, a movement estimating unit 115, and an application control unit 116.

The ranging processing unit 111 performs ranging using the first sensor 14, that is, using the ranging unit 1004 and the light source unit 1005; and obtains depth information. The first face detecting unit 112 detects the face based on the depth information obtained by the ranging processing unit 111. Moreover, the first face detecting unit 112 can compare a plurality of sets of depth information obtained in chronological order, and accordingly detect the movement of the face.

The imaging processing unit 113 performs imaging using the imaging unit 1003 and obtains a taken image. The second face detecting unit 114 detects the face based on the taken image obtained by the imaging processing unit 113. Moreover, the second face detecting unit 114 can compare a plurality of taken images obtained in a chronological order, and accordingly detect the movement of the face.

The movement estimating unit 115 estimates the movement of the terminal device 1 based on the output of the orientation detecting unit 1013. For example, when the user holds the terminal device 1 in hand and moves it, the movement estimating unit 115 can detect the movement according to the movement estimation result based on the output of the orientation detecting unit 1013.

The application control unit 116 controls the operations of the SNS application unit 100 and obtains the state of the SNS application unit 100. For example, based on the result of face detection performed by the first face detecting unit 112 and the second face detecting unit 114, the application control unit 116 controls the operations of the SNS application unit 100.

The programs that are written for implementing the operations of the SNS application unit 100 and the detection/control unit 110 in the terminal device 1 are stored in a downloadable manner in a computer (for example, the server 3) that is connected to the network 2 such as the Internet. Alternatively, the programs can be distributed via the network 2 such as the Internet. Still alternatively, the programs can be recorded as installable files or executable files in a computer-readable recording medium such as a CD (Compact Disk), a flexible disk (FD), or a DVD (Digital Versatile Disk).

Of those programs, the program written for configuring the SNS application unit 100 (i.e., the SNS application 5) has a modular configuration including the UI unit 101, the communication processing unit 102, and the sound processing unit 103. The program written for configuring the detection/control unit 110 (i.e., a control program) has a modular configuration including the ranging processing unit 111, the first face detecting unit 112, the imaging processing unit 113, the second face detecting unit 114, and the application control unit 116. As far as the actual hardware is concerned, the CPU 1000 reads the programs from a recording medium, such as the ROM 1001 or the storage 1006, and executes the programs; so that the abovementioned constituent elements get loaded and generated in the main memory device such as the RAM 1002.

Meanwhile, from among the functions included in the detection/control unit 110, regarding the functions that are same as the preinstalled functions in the terminal device 1, the preinstalled functions in the terminal device 1 can be used. For example, when the terminal device 1 has the preinstalled function of performing face authentication based on the depth information, that face authentication function can be used in the ranging processing unit 111 and the first face detecting unit 112.

(Details of Operations According to First Embodiment)

Figure 11:
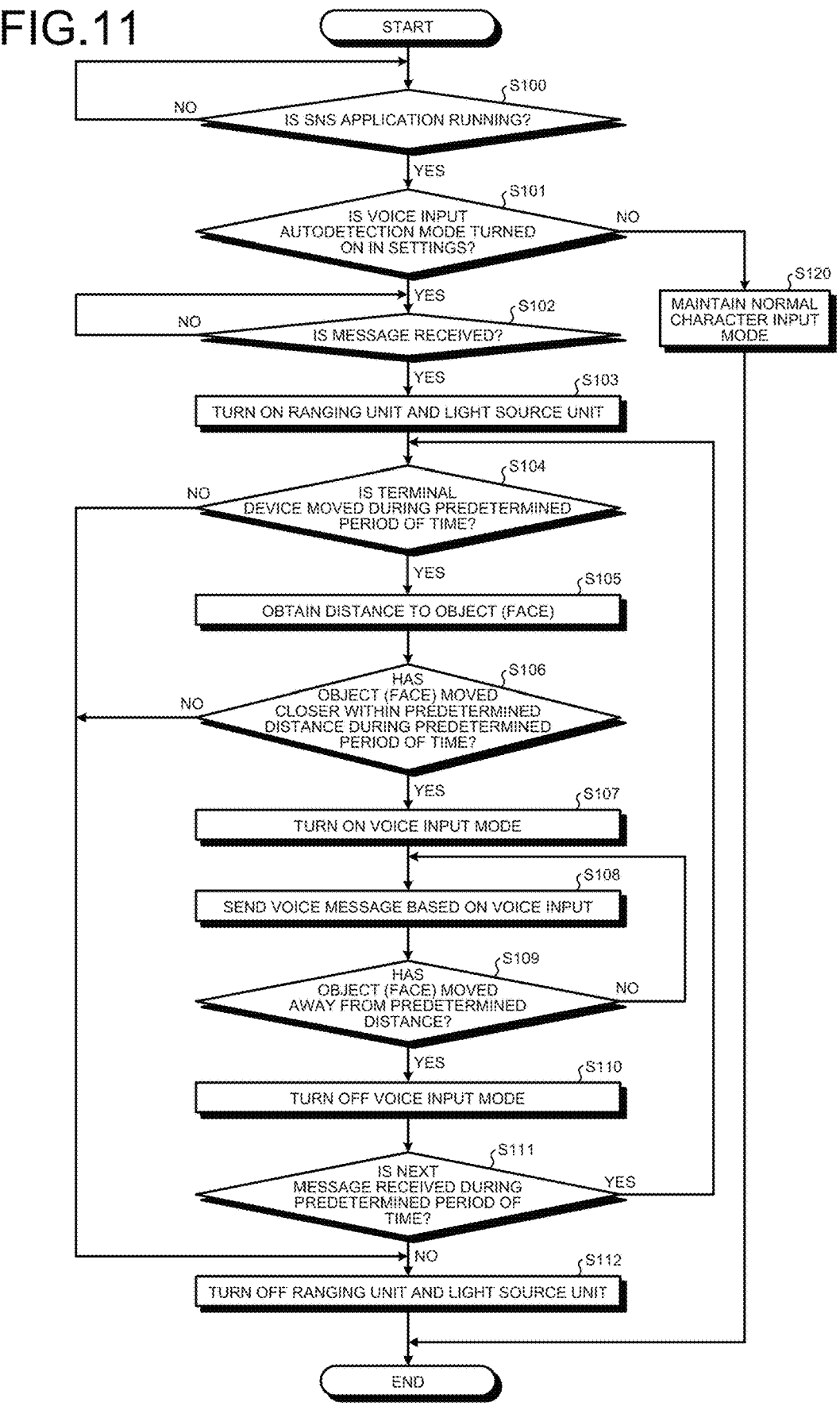
FIG. 11 is an exemplary flowchart for explaining a voice message transmission operation performed in the terminal device according to the first embodiment.

Given below is the more detailed explanation about the operations performed in the terminal device 1 according to the first embodiment. FIG. 11 is an exemplary flowchart for explaining a voice message transmission operation performed in the terminal device 1 according to the first embodiment. At the start of the operations illustrated in the flowchart in FIG. 11, it is assumed that the switches 1061a and 1061b are in the OFF state. Hence, no power is supplied to the ranging unit 1004 and the light source unit 1005, and their functions are disabled. In an identical manner, it is assumed that the switch 1062 is in the OFF state. Hence, no power is supplied to the imaging unit 1003, and its functions are disabled.

At Step S100, the application control unit 116 obtains the state of the SNS application unit 100, and determines whether or not the SNS application 5 is running. If the application control unit 116 determines that the SNS application 5 is not running (No at Step S100), then the system control returns to Step S100. On the other hand, if the application control unit 116 determines that the SNS application 5 is running (Yes at Step S100), then the system control proceeds to Step S101.

At Step S101, the application control unit 116 determines whether or not the voice input autodetection mode is turned ON in the settings. The voice input autodetection mode is an item set, for example, using a setting screen presented by the overall control unit 120. When the voice input autodetection mode is turned ON, the autodetection function of the detection/control unit 110 with respect to a voice input gets enabled. If the application control unit 116 determines that the voice input autodetection mode is not turned ON in the settings (No at Step S101), then the system control proceeds to Step S120.

At Step S120, the application control unit 116 instructs the SNS application unit 100 to maintain the operation mode for inputting messages to the normal character input mode. After the operation at Step S120 is performed, the application control unit 116 ends the sequence of operations illustrated in the flowchart in FIG. 11.

Meanwhile, at Step S101, if the application control unit 116 determines that the voice input autodetection mode is turned ON in the settings (Yes at Step S101), then the system control proceeds to Step S102. At Step S102, the application control unit 116 determines whether or not the SNS application unit 100 has received a message that is sent from another terminal device 1 using the corresponding SNS application 5. In that case, the message can be a text message written by inputting characters, or a voice message given by inputting the voice.

If the application control unit 116 determines that the SNS application unit 100 has not received a message (No at Step S102), then the system control returns to Step S102. On the other hand, if the application control unit 116 determines that the SNS application unit 100 has received a message (Yes at Step S102), then the system control proceeds to Step S103.

At Step S103, the application control unit 116 turns ON the ranging unit 1004 and the light source unit 1005. More particularly, the application control unit 116 instructs, for example, the overall control unit 120 to control the switches 1061a and 1061b in the ON state. As a result of switching ON the switches 1061a and 1061b, power gets supplied to the ranging unit 1004 and the light source unit 1005, and their functions are enabled. Once the functions of the ranging unit 1004 and the light source unit 1005 are enabled, the ranging processing unit 111 starts the ranging operation based on the depth information output from the ranging unit 1004.

Subsequently, at Step S104, the application control unit 116 determines whether or not the terminal device 1 has been moved during a predetermined period of time since the point of time of reception of the message at Step S102. The application control unit 116 can determine about the movement of the terminal device 1 based on, for example, the output of the movement estimating unit 115.

Herein, although the explanation is given about the case in which it is determined at Step S104 about whether or not the terminal device 1 has been moved, that is not the only possible case. For example, at Step S104, the face can be detected based on the depth information obtained by the ranging processing unit 111, and it can be determined whether or not the detected face has moved closer to the terminal device 1. That implies obtaining the variation in the relative position between the terminal device 1 and the face representing the ranging target.

If the application control unit 116 determines at Step S104 that the terminal device 1 has not been moved during the predetermined period of time (No at Step S104), then the system control proceeds to Step S112. On the other hand, if the application control unit 116 determines at Step S104 that the terminal device 1 has been moved during the predetermined period of time (Yes at Step S104), then the system control proceeds to Step S105.

At Step S105, the application control unit 116 obtains the distance to the object (face) based on the face detection result obtained by the first face detecting unit 112. Subsequently, at Step S106, based on the distance obtained at Step S105, the application control unit 116 determines whether or not the object (face) has moved closer within a predetermined distance during a predetermined period of time.

If the application control unit 116 determines at Step S106 that the object (face) has not moved closer within the predetermined distance during the predetermined period of time (No at Step S106), then the system control proceeds to Step S112. That is, in this case, it is possible to think that the user has no intention to perform a voice input and send a voice message. Hence, the subsequent operations related to voice message transmission are cancelled.

On the other hand, if the application control unit 116 determines at Step S106 that the object (face) has moved closer within the predetermined distance during the predetermined period of time (Yes at Step S106), then the system control proceeds to Step S107.

Meanwhile, in FIG. 11, although it is illustrated that the operations at Steps S105 and S106 are over in only one iteration; in practice, the operations at Steps S105 and S106 are performed in a loop until the condition at Step S106 is satisfied.

At Step S107, the application control unit 116 instructs the SNS application unit 100 to set the operation mode to the voice input mode (i.e., to turn ON the voice input mode). In response to the instruction, the SNS application unit 100 sets the operation mode to the voice input mode, and starts voice input processing using the sound processing unit 103 based on the sounds collected by the microphone 12.

Then, at Step S108, in the SNS application unit 100, the communication processing unit 102 sends the voice data, which is obtained as a result of processing performed by the sound processing unit 103, as a voice message to the sender of the message received at Step S102.

Subsequently, at Step S109, based on the face detection result obtained by the first face detecting unit 112, the application control unit 116 determines whether or not the object (face) has moved away from the predetermined distance from the terminal device 1. If the application control unit 116 determines that the object (face) has not moved away from the predetermined distance (No at Step S109), then the system control returns to Step S108.

On the other hand, at Step S109, if the application control unit 116 determines that the object (face) has moved away from the predetermined distance (Yes at Step S109), then the system control proceeds to Step S110. That is, in this case, it is possible to think that the user intends to discontinue or end the transmission of the voice message. At Step S110, the application control unit 116 instructs the SNS application unit 100 to end (turn OFF) the voice input mode. In response to that instruction, the SNS application unit 100 ends the voice input processing performed by the sound processing unit 103, and ends the voice message transmission performed by the communication processing unit 102.

Subsequently, at Step S111, the application control unit 116 determines whether or not the next message is received within a predetermined period of time since ending the voice input mode at Step S110. If the application control unit 116 determines that the next message is received (Yes at Step S111), then the system control returns to Step S104. On the other hand, if the application control unit 116 determines that the next message is not received within the predetermined period of time (No at Step S111), then the system control proceeds to Step S112.

At Step S112, the application control unit 116 turns OFF the ranging unit 1004 and the light source unit 1005. More particularly, the application control unit 116 instructs, for example, the overall control unit 120 to control the switches 1061a and 1061b in the OFF state. As a result of switching OFF the switches 1061a and 1061b, the power supply from the power supply unit 1060 to the ranging unit 1004 and the light source unit 1005 is stopped, and their functions are disabled.

When the operation at Step S112 is finished, the sequence of operations illustrated in the flowchart in FIG. 11 is ended.

In this way, in the first embodiment, the SNS application unit 100 controls the operation of turning ON and turning OFF the voice input mode based on the distance between the terminal device 1 and the face. That eliminates the need for the user to perform an operation such as tapping the touch-sensitive panel 1030 of the terminal device 1 in order to turn ON or turn OFF the voice input mode, and can send a voice message, for example, just by holding the terminal device 1 in one hand and moving it closer to the face. That is, the user becomes able to send a voice message in a contactless manner except for holding the terminal device 1.

Moreover, in the first embodiment, the SNS application unit 100 controls the operation of turning ON and turning OFF the voice input mode based on the output of the ToF sensor 1041 for which infrared light is used as the light source. Hence, even in a dark environment such as in the night time, the control for turning ON and turning OFF the voice input mode can be performed. For example, in the case of performing that control using an image sensor such as a CIS, it is required to have the outside light of some brightness. Hence, such an image sensor is not suitable for use in a dark environment.

Furthermore, in the first embodiment, the distance to the face is measured at the time when a voice input is performed for sending a voice message. Hence, the sensitivity of the microphone 12 (the gain with respect to the output of the microphone 12) can be adjusted based on the distance to the face. That enables transmission of the voice message with an appropriate sound level.

First Modification Example of First Embodiment

Given below is the explanation of a first modification example of the first embodiment. In the first embodiment, the SNS application unit 100 controls the voice input mode based on the distance of the face from the terminal device 1. In contrast, in the first modification example of the first embodiment, the SNS application unit 100 controls the voice input mode by detecting the movement of the mouth based on the depth information.

In the first modification example of the first embodiment, the configuration of the terminal device 1 as explained with reference to FIGS. 6 to 10 according to the first embodiment can be implemented without modification.

Figure 12:
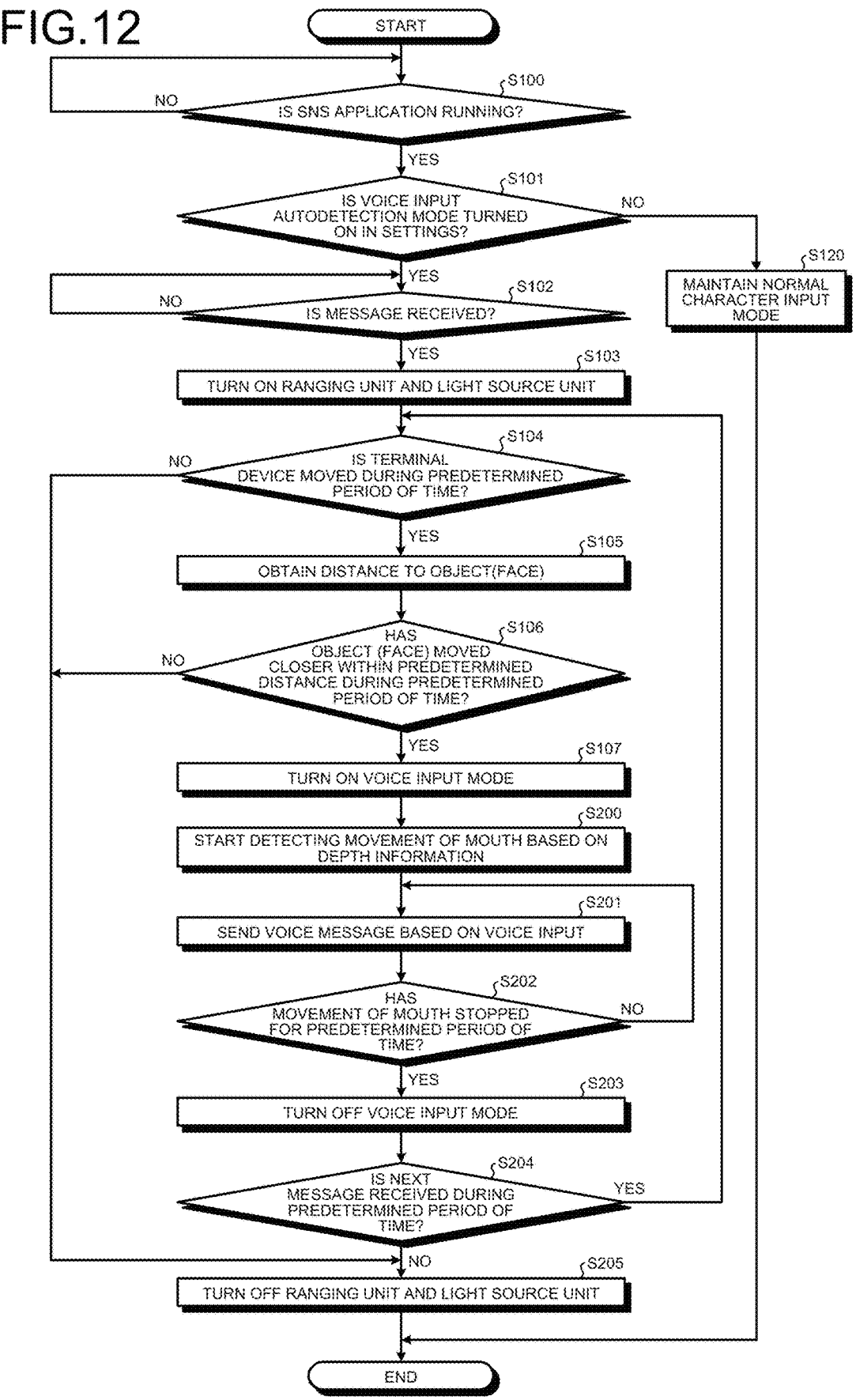
FIG. 12 is an exemplary flowchart for explaining a voice message transmission operation performed in the terminal device according to a first modification example of the first embodiment.

FIG. 12 is an exemplary flowchart for explaining a voice message transmission operation performed in the terminal device 1 according to the first modification example of the first embodiment. In FIG. 12, the operations identical to the operations illustrated in the flowchart in FIG. 11 are referred to by the same step numbers, and their explanation is given in short. At the start of the operations illustrated in the flowchart in FIG. 12, it is assumed that the switches 1061*a* and 1061*b* are in the OFF state. In an identical manner, it is assumed that the switch 1062 is in the OFF state. Hence, no power is supplied to the imaging unit 1003, and its functions are disabled.

In the flowchart illustrated in FIG. 12, the operations from Step S100 to Step S107 are identical to the operations performed from Step S100 to Step S107 illustrated in the flowchart in FIG. 11. That is, at Step S100, the application control unit 116 determines whether or not the SNS application 5 is running. If the application control unit 116 determines that the SNS application 5 is not running (No at Step S100), then the system control returns to Step S100. On the other hand, if the application control unit 116 determines that the SNS application 5 is running (Yes at Step S100), then the system control proceeds to Step S101.

At Step S101, the application control unit 116 determines whether or not the voice input autodetection mode is turned ON in the settings. If the application control unit 116 determines that the voice input autodetection mode is not turned ON in the settings (No at Step S101), then the system control proceeds to Step S120. At Step S120, the application control unit 116 instructs the SNS application unit 100 to maintain the operation mode for inputting messages to the normal character input mode. That marks the end of the sequence of operations illustrated in the flowchart in FIG. 12.

Meanwhile, at Step S101, if the application control unit 116 determines that the voice input autodetection mode is turned ON in the settings (Yes at Step S101), then the system control proceeds to Step S102. At Step S102, the application control unit 116 determines whether or not the SNS application unit 100 has received a message that is sent from another terminal device 1 using the corresponding SNS application 5. If the application control unit 116 determines that the SNS application unit 100 has not received a message (No at Step S102), then the system control returns to Step S102.

On the other hand, if the application control unit 116 determines that the SNS application unit 100 has received a message (Yes at Step S102), then the system control proceeds to Step S103. At Step S103, the application control unit 116 turns ON the ranging unit 1004 and the light source unit 1005.

Subsequently, at Step S104, the application control unit 116 detects the movement of the terminal device 1 using a gyro and determines whether or not the terminal device 1 has been moved during a predetermined period of time since the point of time of reception of the message at Step S102. If the application control unit 116 determines that the terminal device 1 has not been moved (No at Step S104), then the system control proceeds to Step S205.

On the other hand, if the application control unit 116 determines at Step S104 that the terminal device 1 has been moved during the predetermined period of time (Yes at Step S104), then the system control proceeds to Step S105. At Step S105, the application control unit 116 obtains the distance to the object (face) based on the face detection result obtained by the first face detecting unit 112.

Subsequently, at Step S106, based on the distance obtained at Step S105, the application control unit 116 determines whether or not the object (face) has moved closer within a predetermined distance during a predetermined period of time. In an identical manner to the explanation given with reference to FIG. 11; in practice, the operations at Steps S105 and S106 are performed in a loop until the condition at Step S106 is satisfied.

At Step S106, if the application control unit 116 determines that the object (face) has not moved closer within the predetermined distance during the predetermined period of time (No at Step S106), then the system control proceeds to Step S205, and the subsequent operations related to voice message transmission are canceled.

On the other hand, if the application control unit 116 determines at Step S106 that the object (face) has moved closer within the predetermined distance during the predetermined period of time (Yes at Step S106), then the system control proceeds to Step S107. At Step S107, the application control unit 116 instructs the SNS application unit 100 to turn ON the voice input mode.

Subsequently, at Step S200, the application control unit 116 instructs the first face detecting unit 112 to start detecting the movement of the mouth in the face using the face detection result that is based on the depth information. In response to the instruction, the first face detecting unit 112 compares a plurality of sets of depth information obtained in, for example, chronological order and detects the movement of the mouth.

Subsequently, at Step S201, in the SNS application unit 100, the communication processing unit 102 sends the voice data, which has been processed by the sound processing unit 103, as a voice message to the sender of the message received at Step S102.

Then, at Step S202, based on the result of mouth movement detection started by the first face detecting unit 112 at Step S200, the application control unit 116 determines whether or not the movement of the mouth has stopped for a predetermined period of time. At Step S202, if the application control unit 116 determines that the movement of the mouth has not stopped for the predetermined period of time (No at Step S202), then the system control returns to Step S201. On the other hand, if the application control unit 116 determines that the movement of the mouth has stopped for the predetermined period of time (Yes at Step S202), then the system control proceeds to Step S203.

Meanwhile, in FIG. 12, although it is illustrated that the operations at Steps S201 and S202 are over in only one iteration; in practice, the operations at Steps S201 and S202 are performed in a loop until the condition at Step S202 is satisfied.

The operations performed from Step S203 onward are identical to the operations performed from Step S110 onward illustrated in the flowchart in FIG. 11 according to the first embodiment. That is, at Step S203, the application control unit 116 instructs the SNS application unit 100 to end (turn OFF) the voice input mode. In response to the instruction, the SNS application unit 100 ends the voice input processing performed using the sound processing unit 103, and ends the voice message transmission operation performed using the communication processing unit 102.

Subsequently, at Step S204, the application control unit 116 determines whether or not the next message is received within a predetermined period of time since ending the voice input mode at Step S203. If the application control unit 116 determines that the next message is received (Yes at Step S203), then the system control returns to Step S104.

On the other hand, if the application control unit 116 determines that the next message is not received within the predetermined period of time (No at Step S204), then the system control proceeds to Step S205. At Step S205, the application control unit 116 turns OFF the ranging unit 1004 and the light source unit 1005. When the operation at Step S205 is finished, the sequence of operations illustrated in the flowchart in FIG. 11 is ended.

In this way, in the first modification example of the first embodiment, the control for turning OFF the voice input mode is performed according to the result of detecting the movement of the mouth based on the depth information. Hence, voice message transmission can be controlled with higher accuracy.

Moreover, in the first modification example of the first embodiment, in an identical manner to the first embodiment, the user need not perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Furthermore, in the first modification example of the first embodiment, in an identical manner to the first embodiment, the SNS application unit 100 controls the operation of turning ON and turning OFF the voice input mode based on the output of the ToF sensor 1041 for which infrared light is used as the light source. Hence, even in a dark environment such as in the night time, the control for turning ON and turning OFF the voice input mode can be performed.

Second Modification Example of First Embodiment

Given below is the explanation of a second modification example of the first embodiment. In the first modification example of the first embodiment, the SNS application unit 100 controls the voice input mode by detecting the movement of the mouth based on the depth information. In contrast, in the second modification example of the first embodiment, the SNS application unit 100 controls the voice input mode by detecting the movement of the mouth based on a taken image.

In the first modification example of the first embodiment, the configuration of the terminal device 1 as explained with reference to FIGS. 6 to 10 according to the first embodiment can be implemented without modification.

Figure 13:
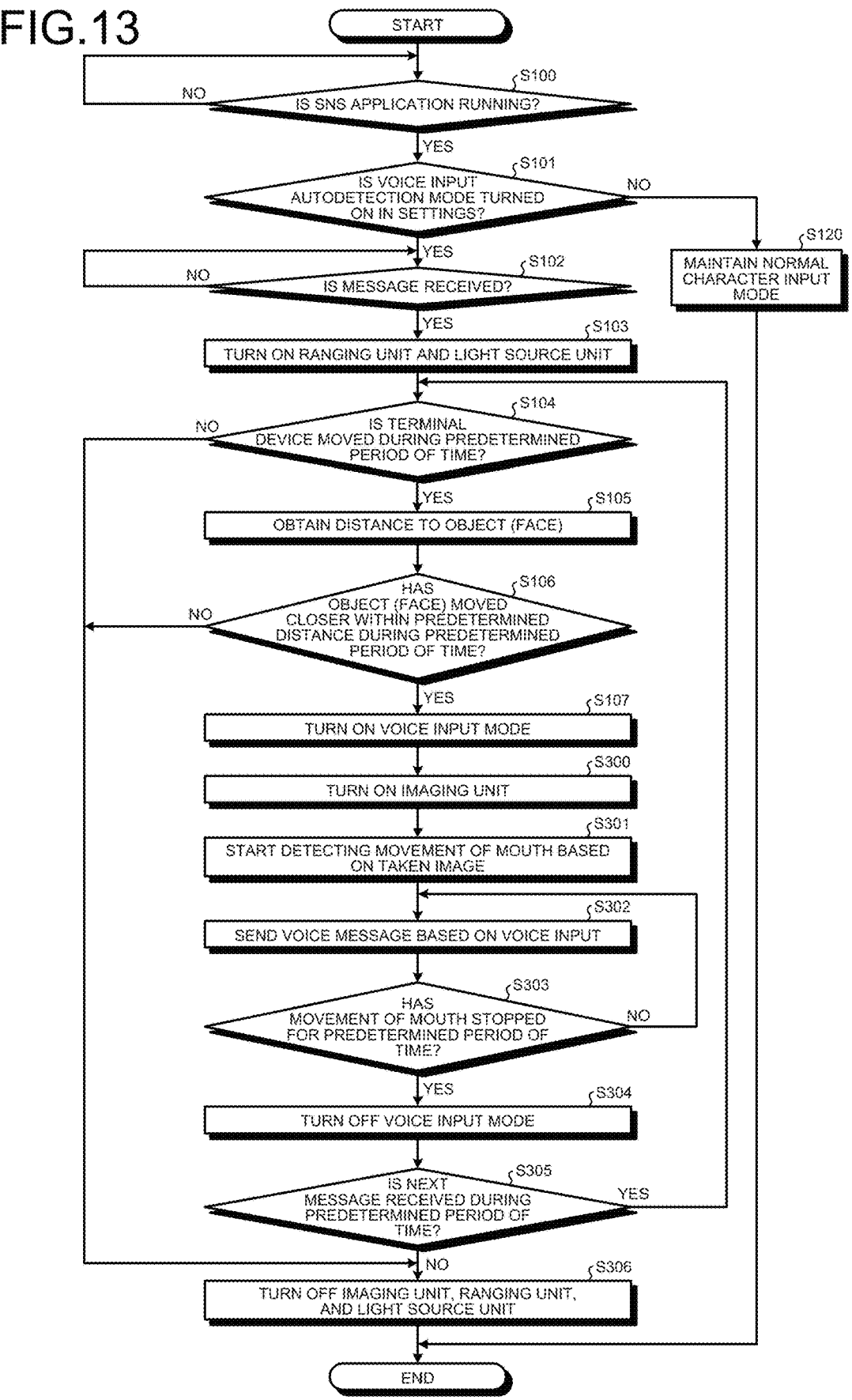
FIG. 13 is an exemplary flowchart for explaining a voice message transmission operation performed in the terminal device according to a second modification example of the first embodiment.

FIG. 13 is an exemplary flowchart for explaining a voice message transmission operation performed in the terminal device 1 according to the second modification example of the first embodiment. In FIG. 13, the operations identical to the operations illustrated in the flowchart in FIG. 11 are referred to by the same step numbers, and their explanation is given in short. At the start of the operations illustrated in the flowchart in FIG. 13, it is assumed that the switches 1061a and 1061b are in the OFF state. In an identical manner, it is assumed that the switch 1062 is in the OFF state. Hence, no power is supplied to the imaging unit 1003, and its functions are disabled.

In the flowchart illustrated in FIG. 13, the operations from Step S100 to Step S107 are identical to the operations performed from Step S100 to Step S107 illustrated in the flowchart in FIG. 11. That is, at Step S100, the application control unit 116 determines whether or not the SNS application 5 is running. If the application control unit 116 determines that the SNS application 5 is not running (No at Step S100), then the system control returns to Step S100. On the other hand, if the application control unit 116 determines that the SNS application 5 is running (Yes at Step S100), then the system control proceeds to Step S101.

At Step S101, the application control unit 116 determines whether or not the voice input autodetection mode is turned ON in the settings. If the application control unit 116 determines that the voice input autodetection mode is not turned ON in the settings (No at Step S101), then the system control proceeds to Step S120. At Step S120, the application control unit 116 instructs the SNS application unit 100 to maintain the operation mode for inputting messages to the normal character input mode. That marks the end of the sequence of operations illustrated in the flowchart in FIG. 13.

Meanwhile, at Step S101, if the application control unit 116 determines that the voice input autodetection mode is turned ON in the settings (Yes at Step S101), then the system control proceeds to Step S102. At Step S102, the application control unit 116 determines whether or not the SNS application unit 100 has received a message that is sent from another terminal device 1 using the corresponding SNS application 5. If the application control unit 116 determines that the SNS application unit 100 has not received a message (No at Step S102), then the system control returns to Step S102.

On the other hand, if the application control unit 116 determines that the SNS application unit 100 has received a message (Yes at Step S102), then the system control proceeds to Step S103. At Step S103, the application control unit 116 turns ON the ranging unit 1004 and the light source unit 1005.

Subsequently, at Step S104, the application control unit 116 detects the movement of the terminal device 1 based on the output of the movement estimating unit 115 and determines whether or not the terminal device 1 has been moved during a predetermined period of time since the point of time of reception of the message at Step S102. If the application control unit 116 determines that the terminal device 1 has not been moved (No at Step S104), then the system control proceeds to Step S306.

On the other hand, if the application control unit 116 determines at Step S104 that the terminal device 1 has been moved during the predetermined period of time (Yes at Step S104), then the system control proceeds to Step S105. At Step S105, the application control unit 116 obtains the distance to the object (face) based on the face detection result obtained by the first face detecting unit 112.

Subsequently, at Step S106, based on the distance obtained at Step S105, the application control unit 116 determines whether or not the object (face) has moved closer within a predetermined distance during a predetermined period of time. In an identical manner to the explanation given with reference to FIG. 11; in practice, the operations at Steps S105 and S106 are performed in a loop until the condition at Step S106 is satisfied.

At Step S106, if the application control unit 116 determines that the object (face) has not moved closer within the predetermined distance during the predetermined period of time (No at Step S106), then the system control proceeds to Step S306, and the subsequent operations related to voice message transmission are canceled.

On the other hand, if the application control unit 116 determines at Step S106 that the object (face) has moved closer within the predetermined distance during the predetermined period of time (Yes at Step S106), then the system control proceeds to Step S107. At Step S107, the application control unit 116 instructs the SNS application unit 100 to turn ON the voice input mode.

Subsequently, at Step S300, the application control unit 116 turns ON the functions of the imaging unit 1003. More particularly, the application control unit 116 instructs, for example, the overall control unit 120 to start supplying power to the imaging unit 1003. In response to the instruction, the overall control unit 120 turns ON the switch 1062 and starts the power supply from the power source unit 1060 to the imaging unit 1003. As a result, the functions of the imaging unit 1003 are enabled, and the imaging processing unit 113 starts obtaining a taken image.

Then, at Step S301, the application control unit 116 instructs the second face detecting unit 114 to start detecting the movement of the mouth in the face using the face detection result that is based on the taken image. In response to the instruction, the second face detecting unit 114 compares a plurality of taken images obtained in, for example, chronological order and detects the movement of the mouth.

Subsequently, at Step S302, in the SNS application unit 100, the communication processing unit 102 sends the voice data, which is obtained as a result of processing performed by the sound processing unit 103, as a voice message to the sender of the message received at Step S102.

Then, at Step S303, based on the result of mouth movement detection started by the second face detecting unit 114 at Step S301, the application control unit 116 determines whether or not the movement of the mouth has stopped for a predetermined period of time. At Step S303, if the application control unit 116 determines that the movement of the mouth has not stopped for the predetermined period of time (No at Step S303), then the system control returns to Step S302. On the other hand, if the application control unit 116 determines that the movement of the mouth has stopped for the predetermined period of time (Yes at Step S303), then the system control proceeds to Step S304.

Meanwhile, in FIG. 13, although it is illustrated that the operations at Steps S302 and S303 are over in only one iteration; in practice, the operations at Steps S302 and S303 are performed in a loop until the condition at Step S303 is satisfied.

The operations performed from Step S304 onward are identical to the operations performed from Step S110 onward illustrated in the flowchart in FIG. 11 according to the first embodiment. That is, at Step S304, the application control unit 116 instructs the SNS application unit 100 to end (turn OFF) the voice input mode. In response to the instruction, the SNS application unit 100 ends the voice input processing performed using the sound processing unit 103, and ends the voice message transmission operation performed using the communication processing unit 102.

Subsequently, at Step S304, the application control unit 116 determines whether or not the next message is received within a predetermined period of time since ending the voice input mode at Step S304. If the application control unit 116 determines that the next message is received (Yes at Step S304), then the system control returns to Step S104.

On the other hand, if the application control unit 116 determines that the next message is not received within the predetermined period of time (No at Step S305), then the system control proceeds to Step S306. At Step S306, the application control unit 116 turns OFF the imaging unit 1003, the ranging unit 1004, and the light source unit 1005. More particularly, the application control unit 116 instructs, for example, the overall control unit 120 to stop the power supply to the imaging unit 1003, the ranging unit 1004, and the light source unit 1005. In response to the instruction, the overall control unit 120 turns OFF the switches 1061a, 1061b, and 1062; and thus stops the power supply to the imaging unit 1003, the ranging unit 1004, and the light source unit 1005.

When the operation at Step S306 is finished, the sequence of operations illustrated in the flowchart in FIG. 13 is ended.

In this way, in the second modification example of the first embodiment, the control for turning OFF the voice input mode is performed according to the result of detecting the movement of the mouth based on the taken image. Herein, in contrast to the fact that the ToF sensor 1041 obtains the depth information consistently based on the point group information, the image sensor of the imaging unit 1003 can output taken images representing, for example, full-color images taken using R (red), G (green), and B (blue) colors. Hence, the movement of the mouth can be detected with higher accuracy. Thus, in the second modification example of the first embodiment, voice message transmission can be controlled with higher accuracy than in the first modification example of the first embodiment.

Moreover, in the second modification example of the first embodiment, in an identical manner to the first embodiment, the user need not perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Second Embodiment

Given below is the explanation of a second embodiment. In the second embodiment, when the SNS application 5 receives a message during the display lock applied by the OS (the overall control unit 120), face authentication is performed based on the depth information and the display lock is released.

Meanwhile, in the second embodiment, the configuration of the terminal device 1 as explained with reference to FIGS. 6 to 10 according to the first embodiment can be implemented without modification.

Figure 14:
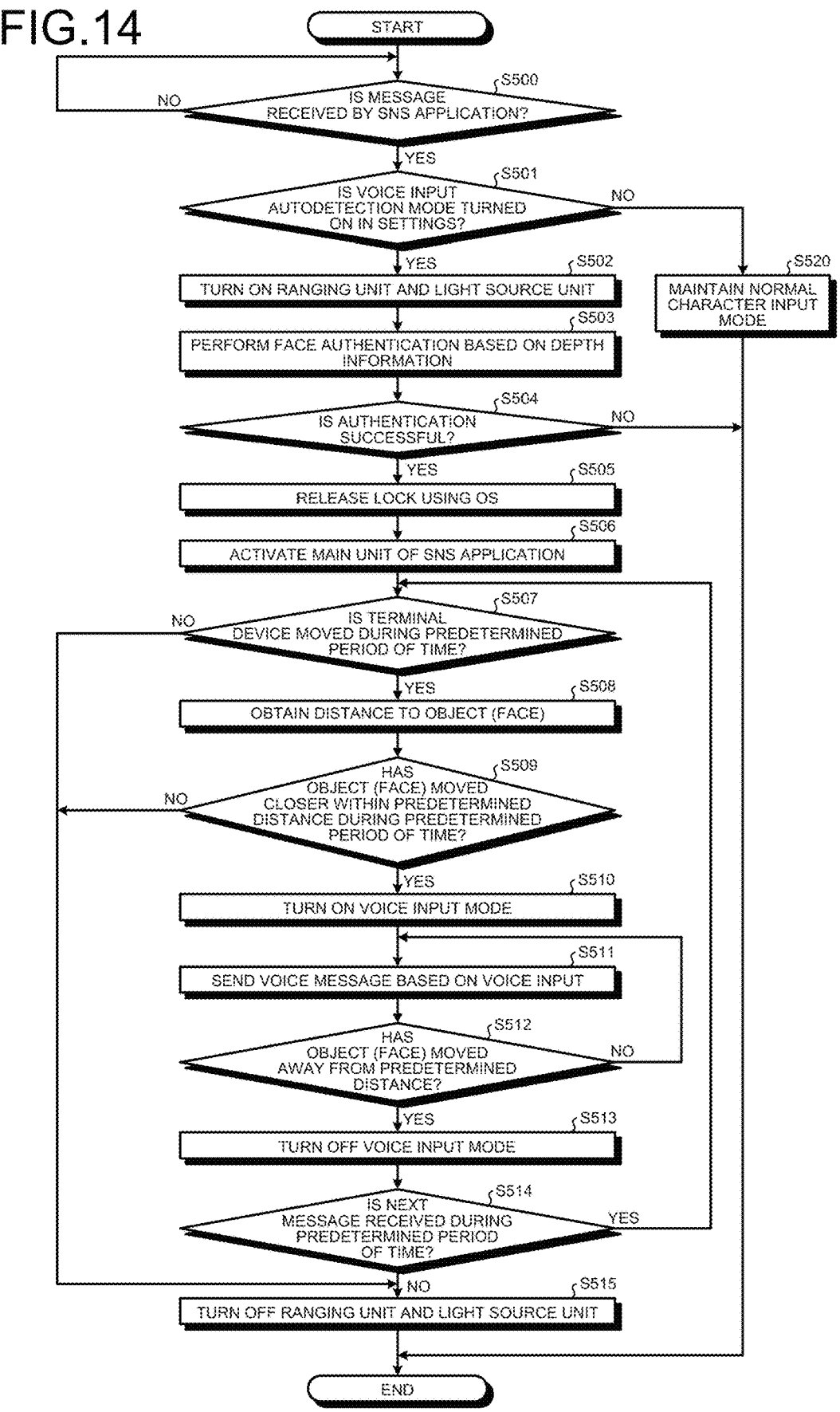
FIG. 14 is an exemplary flowchart for explaining a voice message transmission operation performed in the terminal device according to a second embodiment.

FIG. 14 is an exemplary flowchart for explaining a voice message transmission operation performed in the terminal device 1 according to the second embodiment. At the start of the operations illustrated in the flowchart in FIG. 14, it is assumed that the switches 1061a, 1061b, and 1062 are in the OFF state.

Prior to the operations illustrated in the flowchart in FIG. 14; in the terminal device 1, it is assumed that the OS (the overall control unit 120) has locked the display of the display unit 10 so that, for example, there is a restriction on the operations that the input receiving unit 123 can receive from among the user operations performed using the input device 1007. Moreover, in the display lock state, for example, only some of the functions of the SNS application 5 (for example, the communication processing unit 102) are activated and are implemented in the background.

At Step S500, the application control unit 116 determines whether or not the SNS application unit 100 has received a message that is sent from another terminal device 1 using the corresponding SNS application 5. If the application control unit 116 determines that the SNS application unit 100 has not received a message (No at Step S500), then the system control returns to Step S500. On the other hand, if the application control unit 116 determines that the SNS application unit 100 has received a message (Yes at Step S500), then the system control proceeds to Step S501.

Figure 15A:
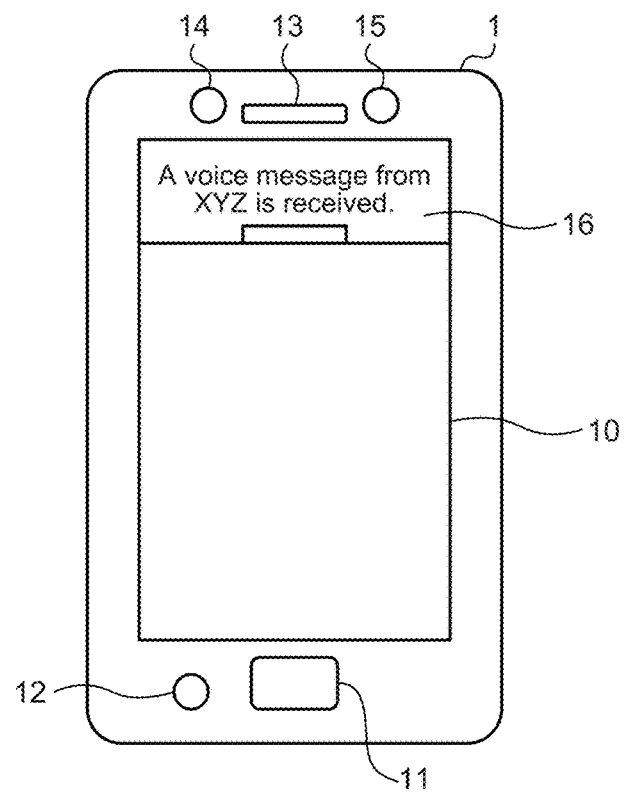
FIG. 15A is a diagram illustrating an example of a banner image that is displayed in the display unit in the display lock state.
Figure 15B:
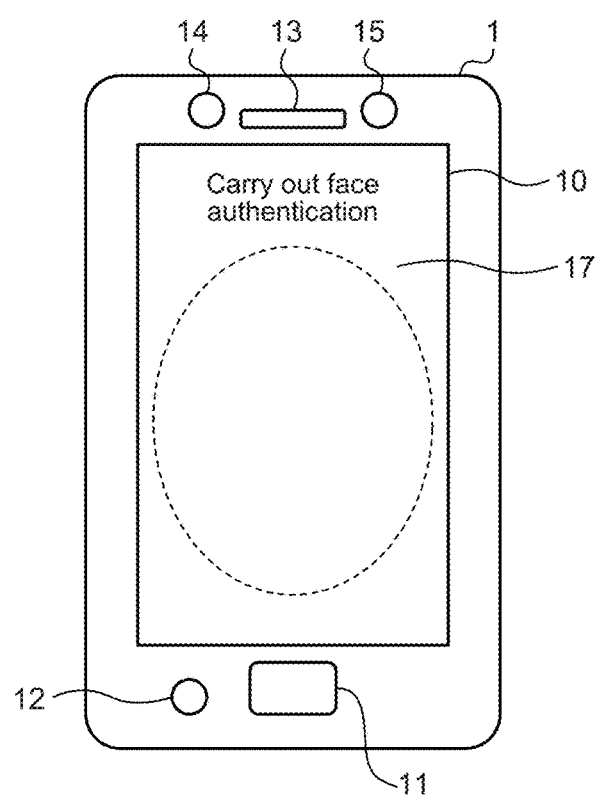
FIG. 15B is a diagram illustrating an example of a display lock release screen to be used for releasing the display lock according to face authentication.

At that time, for example, the UI unit 101 of the SNS application unit 100 displays a banner image in the display unit 10 as an indication that a message has been received. FIG. 15A is a diagram illustrating an example of a banner image 16 that is displayed in the display unit 10 in the display lock state. In the example illustrated in FIG. 15A, the banner image 16 including the brief of the received message is displayed in the upper end of the display unit 10. In the existing technology, for example, when the banner image 16 is tapped (touched by a finger), a display lock release screen meant for inputting the information to release the display lock is displayed in the display unit 10. FIG. 15B is a diagram illustrating an example of a display lock release screen 17 to be used for releasing the display lock according to face authentication.

At Step S501, the application control unit 116 determines whether or not the voice input autodetection mode is turned ON in the settings. If the application control unit 116 determines that the voice input autodetection mode is not turned ON in the settings (No at Step S501), then the system control proceeds to Step S520. At Step S520, the application control unit 116 instructs the SNS application unit 100 to maintain the operation mode for inputting messages to the normal character input mode. That marks the end of the sequence of operations illustrated in the flowchart in FIG. 14.

On the other hand, if the application control unit 116 determines that the voice input autodetection mode is turned ON in the settings (Yes at Step S501), then the system control proceeds to Step S502. At Step S502, the application control unit 116 turns ON the ranging unit 1004 and the light source unit 1005.

Subsequently, at Step S503, the application control unit 116 instructs the authenticating unit 124 to perform face authentication based on the depth information obtained by the first face detecting unit 112. At that time, it is desirable that the application control unit 116 instructs the overall control unit 120 to display the display lock release screen 17 illustrated in FIG. 15B, so as to prompt the user to carry out face authentication.

Then, at Step S504, the application control unit 116 determines whether or not the face authentication performed by the authenticating unit 124 was successful. If the application control unit 116 determines that the face authentication was not successful (No at Step S504), then the sequence of operations illustrated in the flowchart in FIG. 14 is ended. On the other hand, if the application control unit 116 determines that the face authentication was successful (Yes at Step S504), then the system control proceeds to Step S505. At Step S505, the application control unit 116 instructs the overall control unit 120 to release the display lock. Subsequently, at Step S506, the application control unit 116 activates the main unit of the SNS application 5 (i.e., activates the entire SNS application unit 100 including the UI unit 101, the communication processing unit 102, and the sound processing unit 103).

The operations performed from Step S507 onward are identical to the operations performed from Step S104 onward illustrated in the flowchart in FIG. 11 according to the first embodiment. That is, at Step S507, the application control unit 116 detects the movement of the terminal device 1 based on the output of the movement estimating unit 115 and determines whether or not the terminal device 1 has been moved during a predetermined period of time since the point of time of reception of the message at Step S102. If the application control unit 116 determines that the terminal device 1 has not been moved (No at Step S507), then the system control proceeds to Step S515.

On the other hand, if the application control unit 116 determines that the terminal device 1 has been moved during the predetermined period of time (Yes at Step S507), then the system control proceeds to Step S508. At Step S508, the application control unit 116 obtains the distance to the object (face) based on the face detection result obtained by the first face detecting unit 112.

Subsequently, at Step S509, based on the distance obtained at Step S508, the application control unit 116 determines whether or not the object (face) has moved closer within a predetermined distance during a predetermined period of time. Meanwhile, in FIG. 14, although it is illustrated that the operations at Steps S508 and S509 are over in only one iteration; in practice, the operations at Steps S508 and S509 are performed in a loop until the condition at Step S509 is satisfied.

If the application control unit 116 determines at Step S509 that the object (face) has not moved closer within the predetermined distance during the predetermined period of time (No at Step S509), then the system control proceeds to Step S515, and the subsequent operations related to voice message transmission are canceled.

On the other hand, if the application control unit 116 determines at Step S509 that the object (face) has moved closer within the predetermined distance during the predetermined period of time (Yes at Step S509), then the system control proceeds to Step S510. At Step S510, the application control unit 116 instructs the SNS application unit 100 to turn ON the voice input mode. Then, at Step S511, in the SNS application unit 100, the communication processing unit 102 sends the voice data, which is obtained as a result of processing performed by the sound processing unit 103, as a voice message to the sender of the message received at Step S500.

Subsequently, at Step S512, the application control unit 116 determines whether or not the object (face) has moved away from the predetermined distance from the terminal device 1. If the application control unit 116 determines that the object (face) has not moved away from the predetermined distance (No at Step S512), then the system control returns to Step S511. On the other hand, if the application control unit 116 determines that the object (face) has not moved away from the predetermined distance (Yes at Step S512), then the system control proceeds to Step S513.

Meanwhile, in FIG. 14, although it is illustrated that the operations at Steps S511 and S512 are over in only one iteration; in practice, the operations at Steps S511 and S512 are performed in a loop until the condition at Step S512 is satisfied.

At Step S513, the application control unit 116 instructs the SNS application unit 100 to end (turn OFF) the voice input mode. In response to that instruction, the SNS application unit 100 ends the voice input processing performed by the sound processing unit 103, and ends the voice message transmission performed by the communication processing unit 102.

Subsequently, at Step S514, the application control unit 116 determines whether or not the next message is received within a predetermined period of time since ending the voice input mode at Step S513. If the application control unit 116 determines that the next message is received (Yes at Step S513), then the system control returns to Step S507.

On the other hand, if the application control unit 116 determines that the next message is not received within the predetermined period of time (No at Step S514), then the system control proceeds to Step S515. At Step S515, the application control unit 116 turns OFF the ranging unit 1004 and the light source unit 1005. When the operation at Step S515 is finished, the sequence of operations illustrated in the flowchart in FIG. 14 is ended.

In this way, in the second embodiment, when a message is received by the SNS application 5 that runs in the background in the display lock state, the display lock is released by performing face authentication using the depth information, and the main unit of the SNS application 5 is activated. Thus, even if a message is received by the SNS application 5 in the display lock state, the user can still release the display lock and send a voice message using the SNS application 5, for example, just by holding the terminal device 1 in one hand and performing face authentication, without having to perform the operation of tapping the touch-sensitive panel 1030 of the terminal device 1.

At that time, face authentication is performed based on the output of the ToF sensor 1041 for which infrared light is used as the light source. Hence, even in a dark environment such as in the night time, when a message is received by the SNS application 5 in the display lock state, it becomes possible to release the display lock. Moreover, as far as turning ON or turning OFF the voice input mode by the SNS application unit 100 is concerned, since the control is performed based on the output of the ToF sensor 1041 for which infrared light is used as the light source, the ON/OFF control of the voice input mode can be performed even in a dark environment such as in the night time.

Furthermore, in the second embodiment, in an identical manner to the first embodiment, the SNS application unit 100 controls the operation of turning ON and turning OFF the voice input mode based on the distance between the terminal device 1 and the face. That eliminates the need for the user to perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Moreover, in the second embodiment, at the time of performing a voice input for sending a voice message, the distance to the face is measured. Hence, the sensitivity of the microphone 12 (the gain with respect to the output of the microphone 12) can be adjusted based on the distance to the face. That enables transmission of the voice message with an appropriate sound level.

First Modification Example of Second Embodiment

Given below is the explanation of a first modification example of the second embodiment. In the first modification example of the second embodiment, when a message is received by the SNS application 5 in the display lock state applied by the OS (the overall control unit 120), face authentication is performed based on the depth information and the display lock is released. In addition, in an identical manner to the first modification example of the first embodiment, the SNS application unit 100 controls the voice input mode by detecting the movement of the mouth based on the depth information.

In the first modification example of the second embodiment, the configuration of the terminal device 1 as explained with reference to FIGS. 6 to 10 according to the first embodiment can be implemented without modification.

Figure 16:
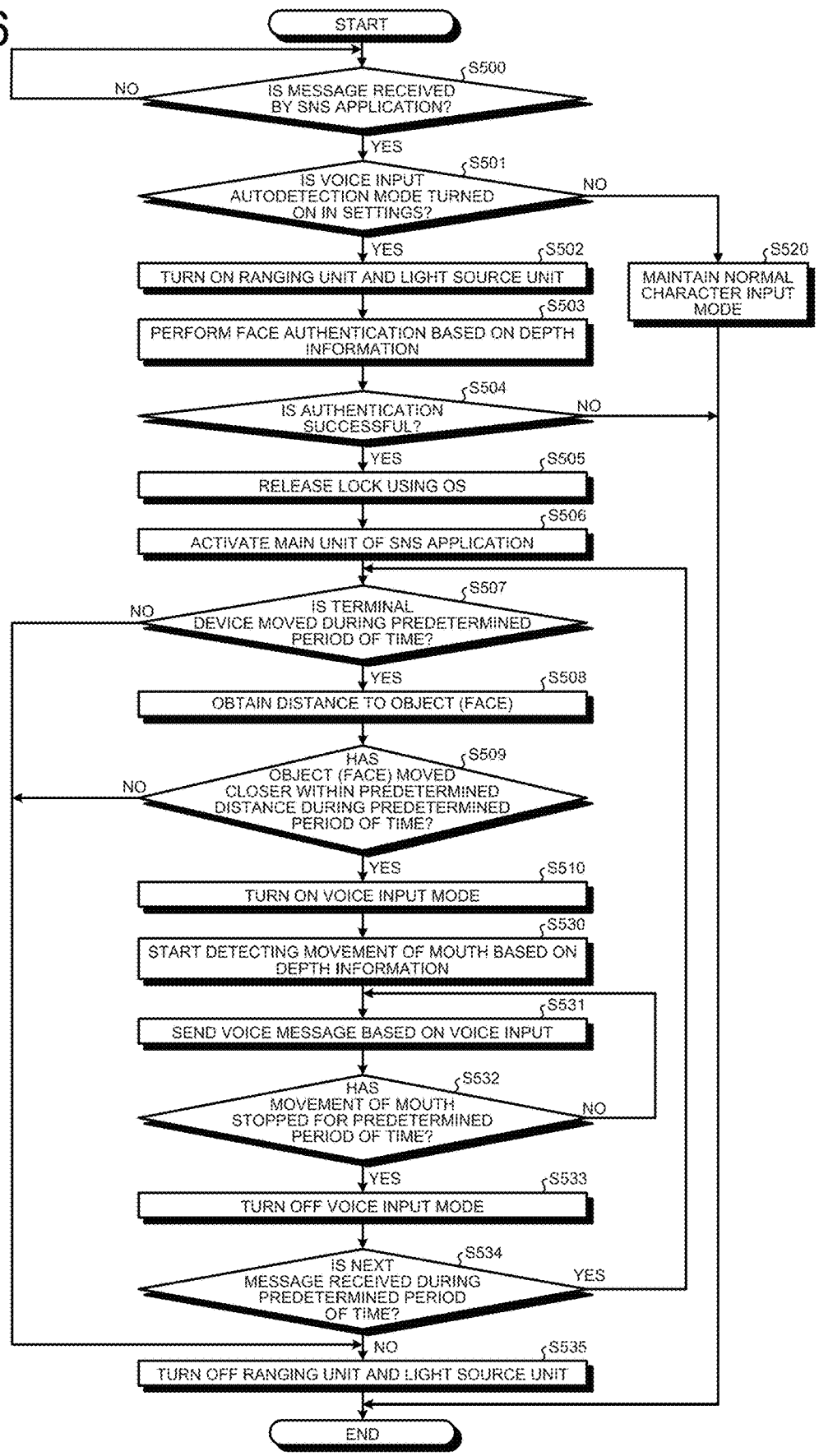
FIG. 16 is an exemplary flowchart for explaining a voice message transmission operation performed in the terminal device according to a first modification example of the second embodiment.

FIG. 16 is an exemplary flowchart for explaining a voice message transmission operation performed in the terminal device 1 according to the first modification example of the second embodiment. In FIG. 16, the operations identical to the operations illustrated in the flowchart in FIG. 14 are referred to by the same step numbers, and their explanation is given in short. At the start of the operations illustrated in the flowchart in FIG. 16, it is assumed that the switches 1061a, 1061b, and 1062 are in the OFF state.

Prior to the operations illustrated in the flowchart in FIG. 16; in the terminal device 1, it is assumed that the OS (the overall control unit 120) has locked the display of the display unit 10; and, for example, some functions of the SNS application 5 are implemented in the background.

The operations performed from Step S500 to Step S510 are identical to the operations performed from Step S500 to Step S510 illustrated in the flowchart in FIG. 14. That is, at Step S500, the application control unit 116 determines whether or not the SNS application unit 100 has received a message that is sent from another terminal device 1 using the corresponding SNS application 5. If the application control unit 116 determines that the SNS application unit 100 has not received a message (No at Step S500), then the system control returns to Step S500.

On the other hand, if the application control unit 116 determines that the SNS application unit 100 has received a message (Yes at Step S500), then the system control proceeds to Step S501. At that time, for example, the UI unit 101 of the SNS application unit 100 displays, as illustrated in FIG. 15A, the banner image 16 in the display unit 10 as an indication that a message has been received.

At Step S501, the application control unit 116 determines whether or not the voice input autodetection mode is turned ON in the settings. If the application control unit 116 determines that the voice input autodetection mode is not turned ON in the settings (No at Step S501), then the system control proceeds to Step S520. At Step S520, the application control unit 116 instructs the SNS application unit 100 to maintain the operation mode for inputting messages to the normal character input mode. That marks the end of the sequence of operations illustrated in the flowchart in FIG. 16.

On the other hand, if the application control unit 116 determines that the voice input autodetection mode is turned ON in the settings (Yes at Step S501), then the system control proceeds to Step S502. At Step S502, the application control unit 116 turns ON the ranging unit 1004 and the light source unit 1005.

Subsequently, at Step S503, the application control unit 116 instructs the authenticating unit 124 to perform face authentication based on the depth information obtained by the first face detecting unit 112. At that time, it is desirable that the application control unit 116 instructs the overall control unit 120 to display the display lock release screen 17 illustrated in FIG. 15B, so as to prompt the user to carry out face authentication.

Then, at Step S504, the application control unit 116 determines whether or not the face authentication performed by the authenticating unit 124 was successful. If the application control unit 116 determines that the face authentication was not successful (No at Step S504), then the sequence of operations illustrated in the flowchart in FIG. 16 is ended. On the other hand, if the application control unit 116 determines that the face authentication was successful (Yes at Step S504), then the system control proceeds to Step S505. At Step S505, the application control unit 116 instructs the overall control unit 120 to release the display lock. At Step S505, the application control unit 116 instructs the overall control unit 120 to release the display lock. Subsequently, at Step S506, the application control unit 116 activates the main unit of the SNS application 5.

The operations performed from Step S507 onward are identical to the operations performed from Step S104 onward illustrated in the flowchart in FIG. 12 according to the first modification example of the first embodiment. That is, at Step S507, the application control unit 116 detects the movement of the terminal device 1 based on the output of the movement estimating unit 115 and determines whether or not the terminal device 1 has been moved during a predetermined period of time since the point of time of reception of the message at Step S500. If the application control unit 116 determines that the terminal device 1 has not been moved (No at Step S507), then the system control proceeds to Step S535.

On the other hand, if the application control unit 116 determines that the terminal device 1 has been moved during the predetermined period of time (Yes at Step S507), then the system control proceeds to Step S508. At Step S508, the application control unit 116 obtains the distance to the object (face) based on the face detection result obtained by the first face detecting unit 112.

Subsequently, at Step S509, based on the distance obtained at Step S508, the application control unit 116 determines whether or not the object (face) has moved closer within a predetermined distance during a predetermined period. In an identical manner to the explanation with reference to FIG. 11; in practice, the operations at Steps S508 and S509 are performed in a loop until the condition at Step S509 is satisfied.

If the application control unit 116 determines at Step S509 that the object (face) has not moved closer within the predetermined distance during the predetermined period of time (No at Step S509), then the system control proceeds to Step S535, and the subsequent operations related to voice message transmission are canceled.

On the other hand, if the application control unit 116 determines at Step S509 that the object (face) has moved closer within the predetermined distance during the predetermined period of time (Yes at Step S509), then the system control proceeds to Step S510. At Step S510, the application control unit 116 instructs the SNS application unit 100 to turn ON the voice input mode.

Subsequently, at Step S530, the application control unit 116 instructs the first face detecting unit 112 to start detecting the movement of the mouth in the face using the face detection result that is based on the depth information. In response to the instruction, the first face detecting unit 112 compares a plurality of sets of depth information obtained in, for example, chronological order and detects the movement of the mouth.

Subsequently, at Step S531, in the SNS application unit 100, the communication processing unit 102 sends the voice data, which has been processed by the sound processing unit 103, as a voice message to the sender of the message received at Step S500.

Then, at Step S532, based on the result of mouth movement detection started by the first face detecting unit 112 at Step S530, the application control unit 116 determines whether or not the movement of the mouth has stopped for a predetermined period of time. At Step S532, if the application control unit 116 determines that the movement of the mouth has not stopped for the predetermined period of time (No at Step S532), then the system control returns to Step S531. On the other hand, if the application control unit 116 determines that the movement of the mouth has stopped for the predetermined period of time (Yes at Step S532), then the system control proceeds to Step S533.

Meanwhile, in FIG. 16, although it is illustrated that the operations at Steps S531 and S532 are over in only one iteration; in practice, the operations at Steps S532 and S532 are performed in a loop until the condition at Step S202 is satisfied.

The operations performed from Step S533 onward are identical to the operations performed from Step S110 onward illustrated in the flowchart in FIG. 11 according to the first embodiment. That is, at Step S533, the application control unit 116 instructs the SNS application unit 100 to end (turn OFF) the voice input mode. In response to the instruction, the SNS application unit 100 ends the voice input processing performed using the sound processing unit 103, and ends the voice message transmission operation performed using the communication processing unit 102.

Subsequently, at Step S534, the application control unit 116 determines whether or not the next message is received within a predetermined period of time since ending the voice input mode at Step S533. If the application control unit 116 determines that the next message is received (Yes at Step S533), then the system control returns to Step S507.

On the other hand, if the application control unit 116 determines that the next message is not received within the predetermined period of time (No at Step S534), then the system control proceeds to Step S535. At Step S535, the application control unit 116 turns OFF the ranging unit 1004 and the light source unit 1005. When the operation at Step S535 is finished, the sequence of operations illustrated in the flowchart in FIG. 16 is ended.

In this way, in the first modification example of the second embodiment, in an identical manner to the second embodiment, when a message is received by the SNS application 5 that runs in the background in the display lock state, the display lock is released by performing face authentication using the depth information, and the main unit of the SNS application 5 is activated. Thus, even if a message is received by the SNS application 5 in the display lock state, the user can still release the display lock and send a voice message using the SNS application 5, for example, just by holding the terminal device 1 in one hand and performing face authentication, without having to perform the operation of tapping the touch-sensitive panel 1030 of the terminal device 1.

Moreover, in the first modification example of the second embodiment, the control for turning OFF the voice input mode is performed according to the result of detecting the movement of the mouth based on the depth information. Hence, voice message transmission can be controlled with higher accuracy.

Furthermore, in the first modification example of the second embodiment, in an identical manner to the second embodiment, the user need not perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Moreover, in the first modification example of the second embodiment, in an identical manner to the second embodiment, as far as turning ON or turning OFF the voice input mode by the SNS application unit 100 is concerned, since the control is performed based on the output of the ToF sensor 1041 for which infrared light is used as the light source, the ON/OFF control of the voice input mode can be performed even in a dark environment such as in the night time.

Furthermore, in the first modification example of the second embodiment, in an identical manner to the second embodiment, the distance to the face is measured at the time when a voice input is performed for sending a voice message. Hence, the sensitivity of the microphone 12 (the gain with respect to the output of the microphone 12) can be adjusted based on the distance to the face. That enables transmission of the voice message with an appropriate sound level.

Second Modification Example of Second Embodiment

Given below is the explanation of a second modification example of the second embodiment. In the second modification example of the second embodiment, when a message is received by the SNS application 5 in the display lock state applied by the OS (the overall control unit 120), face authentication is performed based on the depth information and the display lock is released. In addition, in an identical manner to the second modification example of the first embodiment, the SNS application unit 100 controls the voice input mode by detecting the movement of the mouth based on a taken image.

In the second modification example of the second embodiment, the configuration of the terminal device 1 as explained with reference to FIGS. 6 to 10 according to the first embodiment can be implemented without modification.

Figure 17:
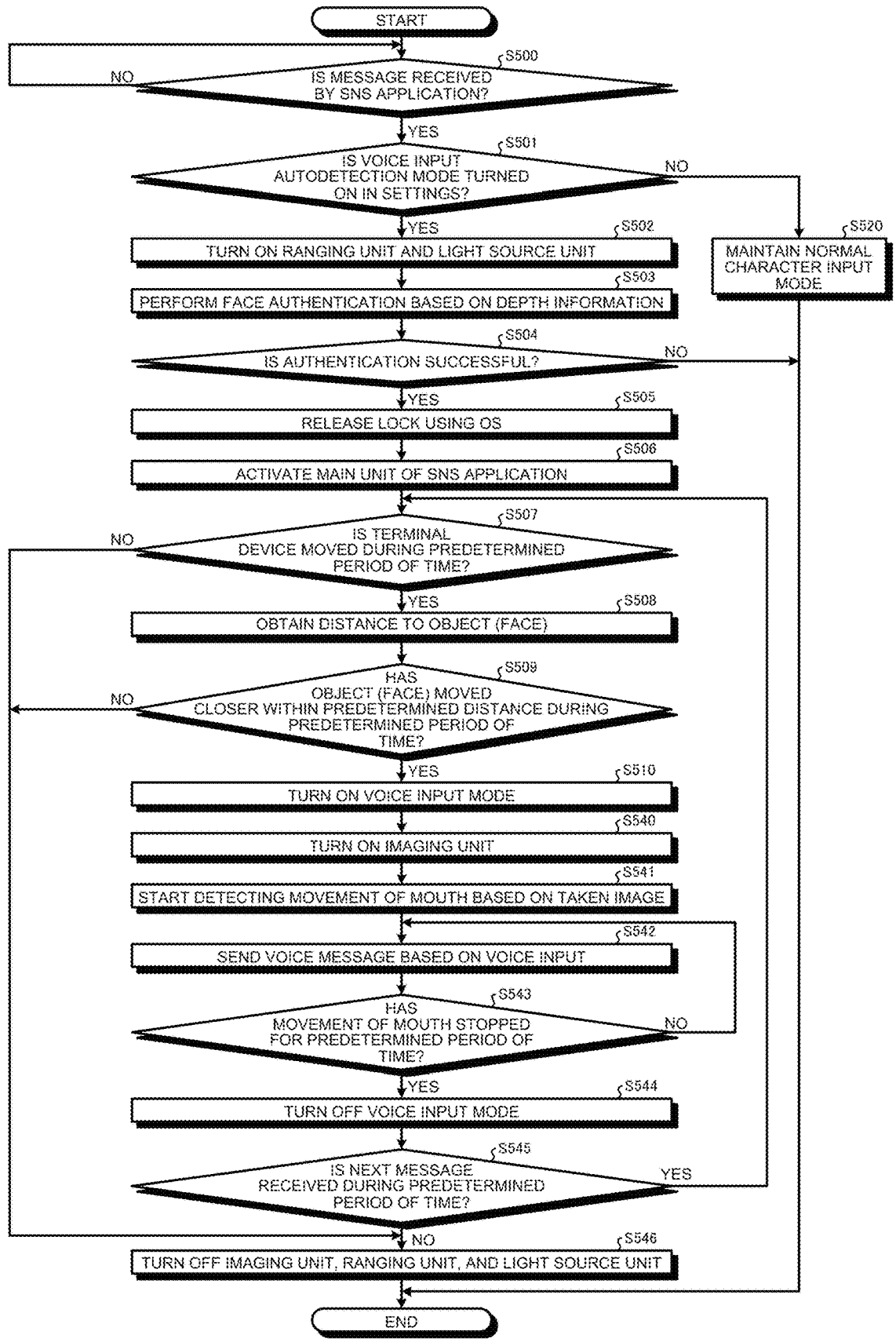
FIG. 17 is an exemplary flowchart for explaining a voice message transmission operation performed in the terminal device according to a second modification example of the second embodiment.

FIG. 17 is an exemplary flowchart for explaining a voice message transmission operation performed in the terminal device 1 according to the second modification example of the second embodiment. In FIG. 17, the operations identical to the operations illustrated in the flowchart in FIG. 14 are referred to by the same step numbers, and their explanation is given in short. At the start of the operations illustrated in the flowchart in FIG. 17, it is assumed that the switches 1061a, 1061b, and 1062 are in the OFF state.

Prior to the operations illustrated in the flowchart in FIG. 17; in the terminal device 1, it is assumed that the OS (the overall control unit 120) has locked the display of the display unit 10; and, for example, some functions of the SNS application 5 are implemented in the background.

The operations performed from Step S500 to Step S510 are identical to the operations performed from Step S500 to Step S510 illustrated in the flowchart in FIG. 14. That is, at Step S500, the application control unit 116 determines whether or not the SNS application unit 100 has received a message that is sent from another terminal device 1 using the corresponding SNS application 5. If the application control unit 116 determines that the SNS application unit 100 has not received a message (No at Step S500), then the system control returns to Step S500.

On the other hand, if the application control unit 116 determines that the SNS application unit 100 has received a message (Yes at Step S500), then the system control proceeds to Step S501. At that time, for example, the UI unit 101 of the SNS application unit 100 displays, as illustrated in FIG. 15A, the banner image 16 in the display unit 10 as an indication that a message has been received.

At Step S501, the application control unit 116 determines whether or not the voice input autodetection mode is turned ON in the settings. If the application control unit 116 determines that the voice input autodetection mode is not turned ON in the settings (No at Step S501), then the system control proceeds to Step S520. At Step S520, the application control unit 116 instructs the SNS application unit 100 to maintain the operation mode for inputting messages to the normal character input mode. That marks the end of the sequence of operations illustrated in the flowchart in FIG. 16.

On the other hand, if the application control unit 116 determines that the voice input autodetection mode is turned ON in the settings (Yes at Step S501), then the system control proceeds to Step S502. At Step S502, the application control unit 116 turns ON the ranging unit 1004 and the light source unit 1005.

Subsequently, at Step S503, the application control unit 116 instructs the authenticating unit 124 to perform face authentication based on the depth information obtained by the first face detecting unit 112. At that time, it is desirable that the application control unit 116 instructs the overall control unit 120 to display the display lock release screen 17 illustrated in FIG. 15B, so as to prompt the user to carry out face authentication.

Then, at Step S504, the application control unit 116 determines whether or not the face authentication performed by the authenticating unit 124 was successful. If the application control unit 116 determines that the face authentication was not successful (No at Step S504), then the sequence of operations illustrated in the flowchart in FIG. 17 is ended. On the other hand, if the application control unit 116 determines that the face authentication was successful (Yes at Step S504), then the system control proceeds to Step S505. At Step S505, the application control unit 116 instructs the overall control unit 120 to release the display lock. Subsequently, at Step S506, the application control unit 116 activates the main unit of the SNS application 5.

The operations performed from Step S507 onward are identical to the operations performed from Step S104 onward illustrated in the flowchart in FIG. 13 according to the second modification example of the first embodiment. That is, at Step S507, the application control unit 116 detects the movement of the terminal device 1 based on the output of the movement estimating unit 115 and determines whether or not the terminal device 1 has been moved during a predetermined period of time since the point of time of reception of the message at Step S500. If the application control unit 116 determines that the terminal device 1 has not been moved (No at Step S507), then the system control proceeds to Step S546.

On the other hand, if the application control unit 116 determines that the terminal device 1 has been moved during the predetermined period of time (Yes at Step S507), then the system control proceeds to Step S508. At Step S508, the application control unit 116 obtains the distance to the object (face) based on the face detection result obtained by the first face detecting unit 112.

Subsequently, at Step S509, based on the distance obtained at Step S508, the application control unit 116 determines whether or not the object (face) has moved closer within a predetermined distance during a predetermined period of time. In an identical manner to the explanation given with reference to FIG. 13; in practice, the operations at Steps S508 and S509 are performed in a loop until the condition at Step S509 is satisfied.

If the application control unit 116 determines at Step S509 that the object (face) has not moved closer within the predetermined distance during the predetermined period of time (No at Step S509), then the system control proceeds to Step S546, and the subsequent operations related to voice message transmission are canceled.

On the other hand, if the application control unit 116 determines at Step S509 that the object (face) has moved closer within the predetermined distance during the predetermined period of time (Yes at Step S509), then the system control proceeds to Step S510. At Step S510, the application control unit 116 instructs the SNS application unit 100 to turn ON the voice input mode.

The operations performed from Step S540 onward are identical to the operations performed from Step S300 onward illustrated in the flowchart in FIG. 13 according to the second modification example of the first embodiment. That is, at Step S540, the application control unit 116 turns ON the functions of the imaging unit 1003 and starts obtaining a taken image using the imaging processing unit 113. Then, at Step S541, the application control unit 116 instructs the second face detecting unit 114 to start detecting the movement of the mouth in the face using the face detection result that is based on the taken image.

Subsequently, at Step S542, in the SNS application unit 100, the communication processing unit 102 sends the voice data, which is obtained as a result of processing performed by the sound processing unit 103, as a voice message to the sender of the message received at Step S102.

Then, at Step S543, based on the result of mouth movement detection started by the second face detecting unit 114 at Step S541, the application control unit 116 determines whether or not the movement of the mouth has stopped for a predetermined period of time. At Step S543, if the application control unit 116 determines that the movement of the mouth has not stopped for the predetermined period of time (No at Step S543), then the system control returns to Step S542. On the other hand, if the application control unit 116 determines that the movement of the mouth has stopped for the predetermined period of time (Yes at Step S543), then the system control proceeds to Step S544.

Meanwhile, in an identical manner to the explanation given with reference to FIG. 13; in practice, the operations at Steps S542 and S543 are performed in a loop until the condition at Step S543 is satisfied.

At Step S544, the application control unit 116 instructs the SNS application unit 100 to end (turn OFF) the voice input mode. In response to that instruction, the SNS application unit 100 ends the voice input processing performed by the sound processing unit 103, and ends the voice message transmission performed by the communication processing unit 102.

Subsequently, at Step S544, the application control unit 116 determines whether or not the next message is received within a predetermined period of time since ending the voice input mode at Step S544. If the application control unit 116 determines that the next message is received (Yes at Step S544), then the system control returns to Step S507.

On the other hand, if the application control unit 116 determines that the next message is not received within the predetermined period of time (No at Step S545), then the system control proceeds to Step S546. At Step S546, the application control unit 116 turns OFF the imaging unit 1003, the ranging unit 1004, and the light source unit 1005. When the operation at Step S546 is finished, the sequence of operations illustrated in the flowchart in FIG. 17 is ended.

In this way, in the second modification example of the second embodiment, in an identical manner to the second embodiment, when the SNS application 5, which runs in the background in the display lock state, receives a message; the display lock is released by performing face authentication based on the depth information, and the main unit of the SNS application 5 is activated. Hence, even if a message is received by the SNS application 5 in the display lock state, the user can still release the display lock and send a voice message using the SNS application 5, for example, just by holding the terminal device 1 in one hand and performing face authentication, without having to perform the operation of tapping the touch-sensitive panel 1030 of the terminal device 1.

Moreover, in the second modification example of the second embodiment, the control for turning OFF the voice input mode is performed according to the result of detecting the movement of the mouth based on the taken image. Herein, in contrast to the fact that the ToF sensor 1041 obtains the depth information based on the point group information, the image sensor of the imaging unit 1003 can output taken images representing, for example, full-color images taken using RGB colors. Hence, the movement of the mouth can be detected with higher accuracy. Thus, in the second modification example of the second embodiment, voice message transmission can be controlled with higher accuracy than in the first modification example of the second embodiment.

Furthermore, in the second modification example of the second embodiment, in an identical manner to the second embodiment, the user need not perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Third Embodiment

Figure 18:
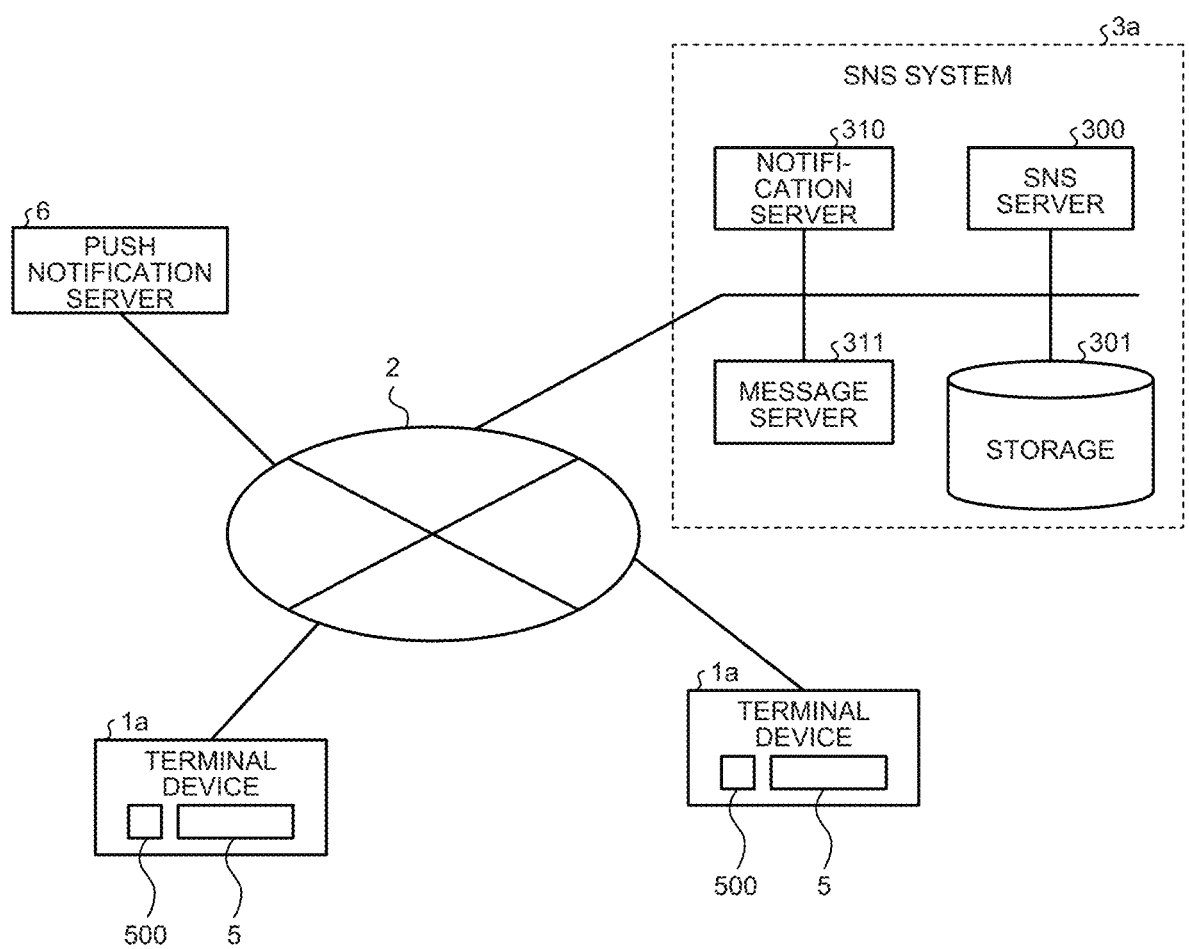
FIG. 18 is a diagram that schematically illustrates an example of an information processing system that is applicable to a third embodiment and that is used in the case of implementing a push notification.

Given below is the explanation of a third embodiment. In the third embodiment, the explanation is given about an example in which a notification about the reception of a message from another terminal device 1a is received by the SNS application 5 in the form of a push notification in the display lock state applied by the OS (the overall control unit 120). FIG. 18 is a diagram that schematically illustrates an example of an information processing system that is applicable to the third embodiment and that is used in the case of implementing a push notification. With reference to FIG. 18, a plurality of terminal devices 1a is connected to an SNS system 3a via the network 2 such as the Internet. Moreover, a push notification server 6 that provides a known push notification service is connected to the network 2.

(Configuration Applicable to Third Embodiment)

In the terminal devices 1a, the hardware configuration explained with reference to FIGS. 6 and 7 can be applied without modification. Each terminal device 1a has the SNS application 5 installed therein for using the SNS provided by the SNS system 3a, and has a driver program 500 according to the third embodiment installed therein. The driver program 500 runs in coordination with the SNS application 5, and controls the ranging unit 1004 in the terminal device 1a by mediating between the OS (Operating System) and the ranging unit 1004.

The SNS system 3a includes an SNS server 300, a storage 301, a notification server 310, and a message server 311. The SNS server 300 has equivalent functions of the functions of the server 3. For example, the SNS server 300 provides the service for enabling transmission and reception of messages including voice messages among the terminal devices 1a via the network 2. The storage 301 corresponds to the storage 4 illustrated in FIG. 1.

The notification server 310 and the message server 311 represent the configuration for issuing push notifications. The message server 311 receives the messages that are sent by the SNS application 5 of each terminal device 1a to the SNS system 3a. When the message server 311 receives a message, the notification server 310 instructs the push notification server 6 to issue a push notification for that message.

Regarding the existing push notifications, the schematic explanation is given with reference to the configuration illustrated in FIG. 18. A push notification is issued from the push notification server 6 to the devices (the terminal devices 1a) in which an application program corresponding to the push notification is installed. In the third embodiment, the SNS application 5 is assumed to be the application program corresponding to push notifications. When a user operation is performed to allow a push notification to the SNS application 5 installed in the concerned terminal device 1a, the SNS application 5 sends identification information, which enables identification thereof, to the push notification server 6 at a predetermined timing such as at the time of activation of the terminal device 1a or the SNS application 5; and requests for a notification ID.

In response to the request, the push notification server 6 issues a notification ID unique to the concerned terminal device 1a, stores the issued notification ID, and sends the notification ID along with the identification information of the SNS application to the sender of the notification ID request. The notification ID is identification information enabling the push notification server 6 to identify the SNS application 5 allowing the push notification and the terminal device 1a in which the concerned SNS application 5 is installed. When the OS (Operating System) of a device is iOS (registered trademark) provided by the Apple Inc. US, the notification ID represents the device token.

The SNS application 5 stores the obtained notification ID in the memory unit (for example, the RAM 1002) of the terminal device 1a. Moreover, the SNS application 5 sends that notification ID to the provider of the SNS application 5 or to the SNS system 3a that is the provider of the message meant for issuing a push notification to the SNS application 5. The SNS system 3a stores the notification ID in the notification server 310.

In the SNS system 3a, when a push notification is to be issued by the notification server 310 to, for example, a particular device; the notification server 310 sends the notification ID for that device to the push notification server 6; receives a message to be push-notified from the message server 311 and sends that message to the push notification server 6; and requests the push notification server 6 to issue a push notification. In response to that request, the push notification server 6 sends the notification ID and the message to the terminal device 1a that is identified by the notification ID.

When the terminal device 1 receives the notification ID and the message; if the SNS application 5 is running, the OS of that terminal device 1a detects the SNS application 5 corresponding to the notification ID, and the detected SNS application 5 displays the message according to a predetermined method. On the other hand, if the OS has locked the display of the display unit 10 and if the SNS application 5 is not running; then, for example, the OS displays the banner image 16 (see FIG. 15A), which indicates the reception of a message, in the display unit 10 in the locked state.

Figure 19:
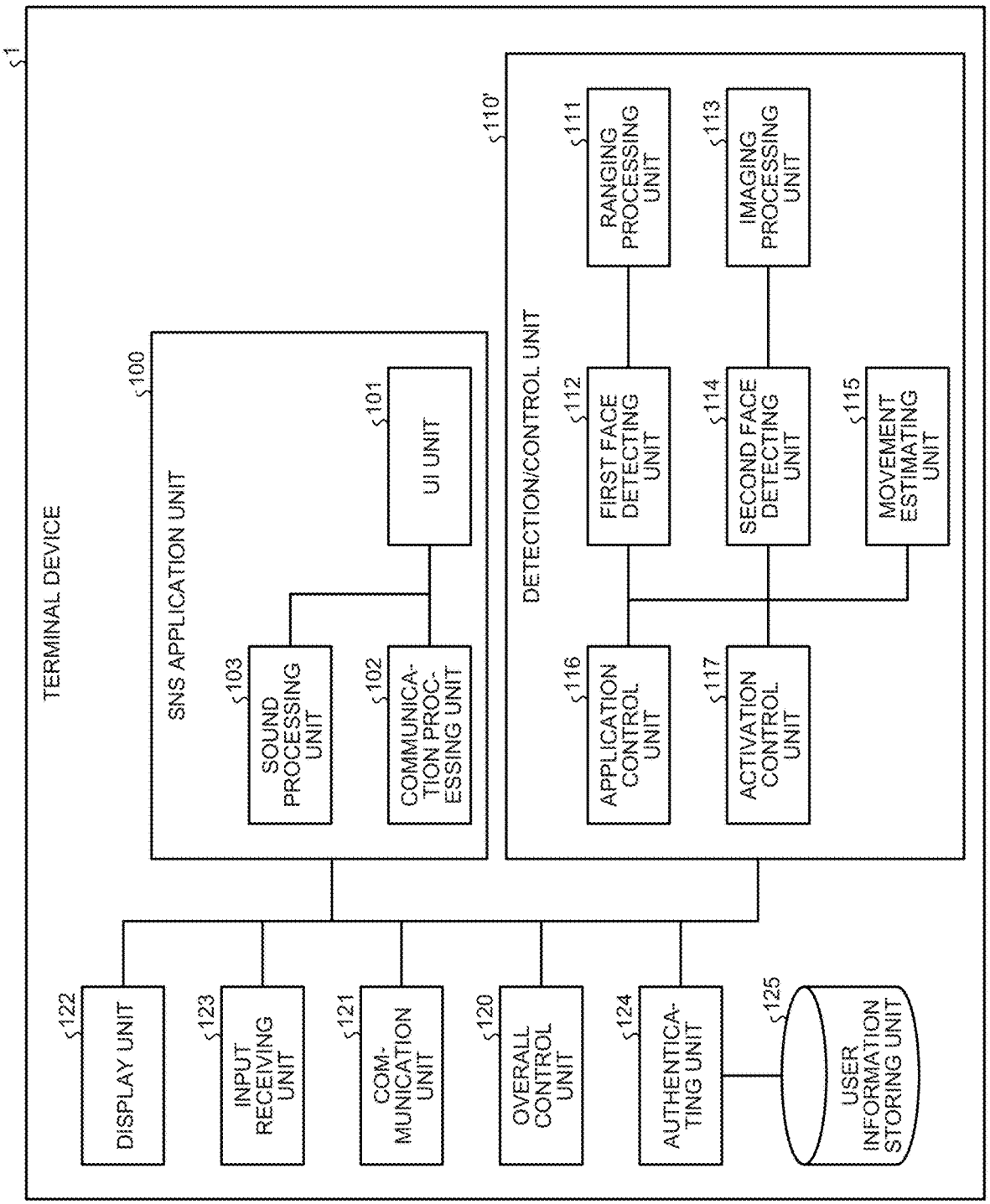
FIG. 19 is an exemplary functional block diagram for explaining the functions of a terminal device according to the third embodiment.

FIG. 19 is an exemplary functional block diagram for explaining the functions of the terminal device 1a according to the third embodiment. In the terminal device 1a, a detection/control unit 110' additionally includes an activation control unit 117 as compared to the detection/control unit 110 explained with reference to FIG. 10. The activation control unit 117 corresponds to the driver program 500 explained with reference to FIG. 18, and controls the operations of the ranging unit 1004 by mediating between the OS (Operating System) and the ranging unit 1004. The activation control unit 117 can be formed in the terminal device 1a by installing, in the terminal device 1a, a driver installation program that is either downloaded via the network 2 or recorded in a computer-readable recording medium such as a CD, an FD, or a DVD.

Meanwhile, in the third embodiment, regarding the hardware configuration of the terminal device 1a, the configuration of the terminal device 1 explained with reference to FIGS. 6 and 7 according to the first embodiment can be applied without modification.

(Details of Operations According to Third Embodiment)

Figure 20:
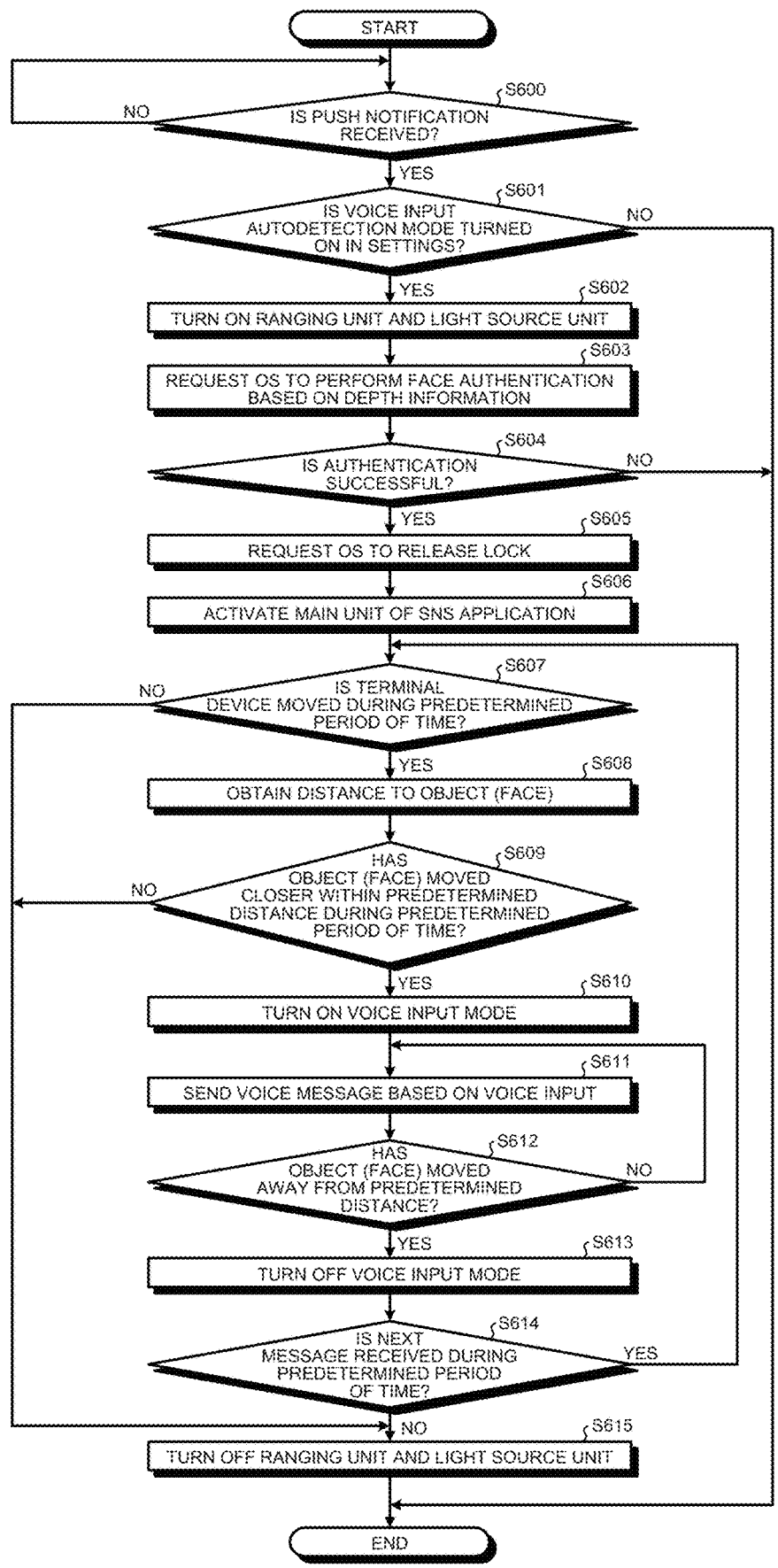
FIG. 20 is an exemplary flowchart for explaining a voice message transmission operation performed in the terminal device according to the third embodiment.

FIG. 20 is an exemplary flowchart for explaining a voice message transmission operation performed in the terminal device 1a according to the third embodiment.

At the start of the operations illustrated in the flowchart in FIG. 20, it is assumed that the switches 1061a, 1061b, and 1062 are in the OFF state. Prior to the operations illustrated in the flowchart in FIG. 20; in the terminal device 1a, it is assumed that the OS (the overall control unit 120) has locked the display of the display unit 10. Moreover, at that time, it is assumed that the SNS application 5 is not running even in the background.

At Step S600, the activation control unit 117 makes an inquiry to the overall control unit 120 about the presence or absence of a message reception notification in the form of a push notification. If the activation control unit 117 determines according to the result of the inquiry that there is no notification (No at Step S600), then the system control returns to Step S600. On the other hand, if the activation control unit 117 determines according to the result of the inquiry that there is a notification (Yes at Step S600), then the system control proceeds to Step S601. At that time, for example, the overall control unit 120 displays the banner image 16 (see FIG. 15A), which indicates that a message is received, in the display unit 10.

At Step S601, the activation control unit 117 makes an inquiry to the overall control unit 120 about whether or not the voice input autodetection mode is turned ON in the settings. If the activation control unit 117 determines according to the result of the inquiry that the voice input autodetection mode is not turned ON in the settings (No at Step S601), then the sequence of operations illustrated in FIG. 20 is ended.

In that case, under the normal control of the overall control unit 120, for example, as a result of tapping on the position of the banner image 16 displayed in the display unit 10, the overall control unit 120 displays the display lock release screen in the display unit 10. Then, in response to a predetermined display lock release operation, the overall control unit 120 activates the SNS application 5. That enables transmission and reception of messages using the SNS application 5.

On the other hand, if the activation control unit 117 determines according to the result of the inquiry that the voice input autodetection mode is turned ON in the settings (Yes at Step S601), then the system control proceeds to Step S602. At Step S602, the activation control unit 117 turns ON the ranging unit 1004 and the light source unit 1005.

Subsequently, at Step S603, the activation control unit 117 requests the overall control unit 120 to ensure that the authenticating unit 124 performs face authentication based on the depth information obtained by the first face detecting unit 112. In response to that request, the overall control unit 120 performs face authentication based on the depth information. At that time, the overall control unit 120 can display the display lock release screen 17 illustrated in FIG. 15B in the display unit 10, so as to prompt the user to carry out face authentication.

Then, at Step S604, the activation control unit 117 makes an inquiry to the overall control unit 120 about whether or not the face authentication performed by the authenticating unit 124 was successful. If the activation control unit 117 determines according to the result of the inquiry that the authentication was not successful (No at Step S604), then the sequence of operations illustrated in the flowchart in FIG. 20 is ended. On the other hand, if the activation control unit 117 determines according to the result of the inquiry that the authentication was successful (Yes at Step S604), then the system control proceeds to Step S605.

At Step S605, the activation control unit 117 requests the overall control unit 120 to release the display lock. In response to that request, the overall control unit 120 releases the display lock. Then, at Step S606, the activation control unit 117 activates the main unit of the SNS application 5. The activation of the main unit of the SNS application 5 can be alternatively performed by the overall control unit 120.

The operations performed from Step S607 onward are identical to the operations performed from Step S104 onward illustrated in the flowchart in FIG. 11 according to the first embodiment. That is, at Step S607, the application control unit 116 detects the movement of the terminal device 1a based on the output of the movement estimating unit 115 and determines whether or not the terminal device 1 has been moved during a predetermined period of time since, for example, the point of time of reception of a message at Step S600. If the application control unit 116 determines that the terminal device 1a has not been moved (No at Step S607), then the system control proceeds to Step S615.

On the other hand, if the application control unit 116 determines at Step S607 that the terminal device 1a has been moved during the predetermined period of time (Yes at Step S607), then the system control proceeds to Step S608. At Step S608, the application control unit 116 obtains the distance to the object (face) based on the face detection result obtained by the first face detecting unit 112.

Subsequently, at Step S609, based on the distance obtained at Step S608, the application control unit 116 determines whether or not the object (face) has moved closer within a predetermined distance during a predetermined period of time. Meanwhile, in FIG. 20, although it is illustrated that the operations at Steps S608 and S609 are over in only one iteration; in practice, the operations at Steps S608 and S609 are performed in a loop until the condition at Step S609 is satisfied.

If the application control unit 116 determines at Step S609 that the object (face) has not moved closer within the predetermined distance during the predetermined period of time (No at Step S609), then the system control proceeds to Step S615 and the subsequent operations related to voice message transmission are cancelled.

On the other hand, if the application control unit 116 determines at Step S609 that the object (face) has moved closer within the predetermined distance during the predetermined period of time (Yes at Step S609), then the system control proceeds to Step S610. At Step S610, the application control unit 116 instructs the SNS application unit 100 to turn ON the voice input mode. Then, at Step S611, in the SNS application unit 100, the communication processing unit 102 sends the voice data, which is obtained as a result of processing performed by the sound processing unit 103, as a voice message to the sender of the message received at Step S600.

Subsequently, at Step S612, based on the face detection result obtained by the first face detecting unit 112, the application control unit 116 determines whether or not the object (face) has moved away from the predetermined distance from the terminal device 1a. If the application control unit 116 determines that the object (face) has not moved away from the predetermined distance (No at Step S612), then the system control returns to Step S611. On the other hand, at Step S612, if the application control unit 116 determines that the object (face) has moved away from the predetermined distance (Yes at Step S612), then the system control proceeds to Step S613.

Meanwhile, in FIG. 20, although it is illustrated that the operations at Steps S611 and S612 are over in only one iteration; in practice, the operations at Steps S611 and S612 are performed in a loop until the condition at Step S612 is satisfied.

At Step S613, the application control unit 116 instructs the SNS application unit 100 to end (turn OFF) the voice input mode. In response to that instruction, the SNS application unit 100 ends the voice input processing performed by the sound processing unit 103, and ends the voice message transmission performed by the communication processing unit 102.

Subsequently, at Step S614, the application control unit 116 determines whether or not the next message is received within a predetermined period of time since ending the voice input mode at Step S613. If the application control unit 116 determines that the next message is received (Yes at Step S614), then the system control returns to Step S607.

On the other hand, if the application control unit 116 determines that the next message is not received within the predetermined period of time (No at Step S614), then the system control proceeds to Step S615. At Step S615, the activation control unit 117 turns OFF the ranging unit 1004 and the light source unit 1005. When the operation at Step S615 is finished, the sequence of operations illustrated in the flowchart in FIG. 20 is ended.

In this way, in the third embodiment, the ranging unit 1004 and the light source unit 1005 are turned ON in response to a push notification, and the face authentication is performed based on the depth information. Thus, even if a message sent from another terminal device 1a using the corresponding SNS application 5 is received in the display lock state, the user can still release the display lock and send a voice message using the SNS application 5, for example, just by holding the terminal device 1a in one hand and performing face authentication, without having to perform the operation of tapping the touch-sensitive panel 1030 of the terminal device 1a.

Moreover, in the third embodiment, in an identical manner to the first embodiment, the SNS application unit 100 controls the operation of turning ON and turning OFF the voice input mode based on the distance between the terminal device 1a and the face. That eliminates the need for the user to perform an operation such as tapping the touch-sensitive panel 1030 of the terminal device 1a in order to turn ON or turn OFF the voice input mode, and can send a voice message, for example, just by holding the terminal device 1a in one hand and moving it closer to the face.

Furthermore, in the third embodiment, the distance to the face is measured at the time when a voice input is performed for sending a voice message. Hence, the sensitivity of the microphone 12 (the gain with respect to the output of the microphone 12) can be adjusted based on the distance to the face. That enables transmission of the voice message with an appropriate sound level.

First Modification Example of Third Embodiment

Given below is the explanation of a first modification example of the third embodiment. In the first modification example of the third embodiment, a notification about the reception of a message from another terminal device 1a is received by the SNS application 5 in the form of a push notification in the display lock state applied by the OS (the overall control unit 120). Along with that, in an identical manner to the first modification example of the first embodiment, the SNS application unit 100 controls the voice input mode by detecting the movement of the mouth based on the depth information.

Meanwhile, in the first modification example of the third embodiment; regarding the hardware configuration of the terminal device 1a, the configuration of the terminal device 1 explained with reference to FIGS. 6 and 7 according to the first embodiment can be applied without modification.

Figure 21:
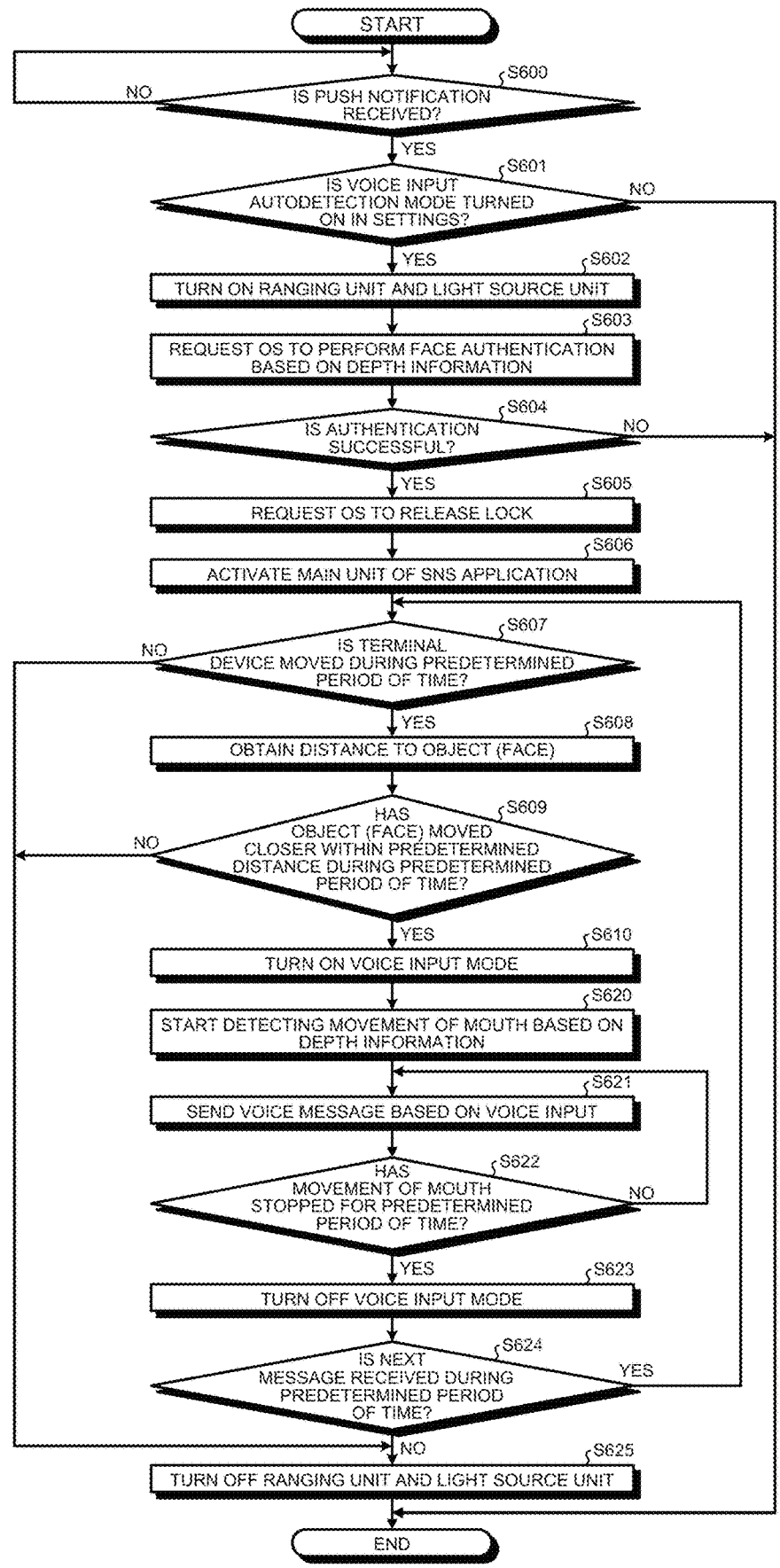
FIG. 21 is an exemplary flowchart for explaining a voice message transmission operation performed in the terminal device according to a first modification example of the third embodiment.

FIG. 21 is an exemplary flowchart for explaining a voice message transmission operation performed in the terminal device 1a according to the first modification example of the third embodiment.

In FIG. 21, the operations identical to the operations illustrated in the flowchart in FIG. 20 are referred to by the same step numbers, and their explanation is given in short. At the start of the operations illustrated in the flowchart in FIG. 21, it is assumed that the switches 1061a, 1061b, and 1062 are in the OFF state. Moreover, in an identical manner to the flowchart illustrated in FIG. 20, prior to the operations illustrated in the flowchart in FIG. 21; in the terminal device 1a, it is assumed that the OS (the overall control unit 120) has locked the display of the display unit 10. Moreover, at that time, it is assumed that the SNS application 5 is not running even in the background.

In FIG. 21, the operations from Step S600 to Step S606 are identical to the operations from Step S600 to Step S606 illustrated in the flowchart in FIG. 20. That is, at Step S600, the activation control unit 117 makes an inquiry to the overall control unit 120 about the presence or absence of a message reception notification in the form of a push notification. If the activation control unit 117 determines according to the result of the inquiry that there is no notification (No at Step S600), then the system control returns to Step S600. On the other hand, if the activation control unit 117 determines according to the result of the inquiry that there is a notification (Yes at Step S600), then the system control proceeds to Step S601. At that time, for example, the overall control unit 120 displays the banner image 16 (see FIG. 15A), which indicates that a message is received, in the display unit 10.

At Step S601, the activation control unit 117 makes an inquiry to the overall control unit 120 about whether or not the voice input autodetection mode is turned ON in the settings. If the activation control unit 117 determines according to the result of the inquiry that the voice input autodetection mode is not turned ON in the settings (No at Step S601), then the sequence of operations illustrated in FIG. 20 is ended.

In that case, under the normal control of the overall control unit 120, for example, as a result of tapping on the position of the banner image 16 displayed in the display unit 10, the overall control unit 120 displays the display lock release screen in the display unit 10. Then, in response to a predetermined display lock release operation, the overall control unit 120 activates the SNS application 5. That enables transmission and reception of messages using the SNS application 5.

On the other hand, if the activation control unit 117 determines according to the result of the inquiry that the voice input autodetection mode is turned ON in the settings (Yes at Step S601), then the system control proceeds to Step S602. At Step S602, the activation control unit 117 turns ON the ranging unit 1004 and the light source unit 1005.

Subsequently, at Step S603, the activation control unit 117 requests the overall control unit 120 to ensure that the authenticating unit 124 performs face authentication based on the depth information obtained by the first face detecting unit 112. In response to that request, the overall control unit 120 performs face authentication based on the depth information.

Then, at Step S604, the activation control unit 117 makes an inquiry to the overall control unit 120 about whether or not the face authentication performed by the authenticating unit 124 was successful. If the activation control unit 117 determines according to the result of the inquiry that the authentication was not successful (No at Step S604), then the sequence of operations illustrated in the flowchart in FIG. 20 is ended. On the other hand, if the activation control unit 117 determines according to the result of the inquiry that the authentication was successful (Yes at Step S604), then the system control proceeds to Step S605.

At Step S605, the activation control unit 117 requests the overall control unit 120 to release the display lock. In response to that request, the overall control unit 120 releases the display lock. Then, at Step S606, the activation control unit 117 activates the main unit of the SNS application 5. The activation of the main unit of the SNS application 5 can be alternatively performed by the overall control unit 120.

The operations performed from Step S607 onward are identical to the operations performed from Step S104 onward illustrated in the flowchart in FIG. 12 according to the first modification example of the first embodiment. That is, at Step S607, the application control unit 116 detects the movement of the terminal device 1 based on the output of the movement estimating unit 115 and determines whether or not the terminal device 1 has been moved during a predetermined period of time since the point of time of reception of the message at Step S600. If the application control unit 116 determines that the terminal device 1 has not been moved (No at Step S607), then the system control proceeds to Step S625.

On the other hand, if the application control unit 116 determines that the terminal device 1 has been moved within the predetermined period of time (Yes at Step S607), then the system control proceeds to Step S608. At Step S608, the application control unit 116 obtains the distance to the object (face) based on the face detection result obtained by the first face detecting unit 112.

Subsequently, at Step S609, based on the distance obtained at Step S608, the application control unit 116 determines whether or not the object (face) has moved closer within a predetermined distance during a predetermined period of time. In an identical manner to the explanation given with reference to FIG. 11; in practice, the operations at Steps S608 and S609 are performed in a loop until the condition at Step S609 is satisfied.

If the application control unit 116 determines at Step S609 that the object (face) has not moved closer within the predetermined distance during the predetermined period of time (No at Step S609), then the system control proceeds to Step S625 and the subsequent operations related to voice message transmission are cancelled.

On the other hand, if the application control unit 116 determines at Step S609 that the object (face) has moved closer within the predetermined distance during the predetermined period of time (Yes at Step S609), then the system control proceeds to Step S610. At Step S610, the application control unit 116 instructs the SNS application unit 100 to turn ON the voice input mode).

Then, at Step S620, the application control unit 116 instructs the first face detecting unit 112 to start detecting the movement of the mouth in the face using the face detection result that is based on the depth information. In response to the instruction, the first face detecting unit 112 compares a plurality of sets of depth information obtained in, for example, chronological order and detects the movement of the mouth.

Subsequently, at Step S621, in the SNS application unit 100, the communication processing unit 102 sends the voice data, which has been processed by the sound processing unit 103, as a voice message to the sender of the message received at Step S600.

Then, at Step S622, based on the result of mouth movement detection started by the first face detecting unit 112 at Step S620, the application control unit 116 determines whether or not the movement of the mouth has stopped for a predetermined period of time. At Step S622, if the application control unit 116 determines that the movement of the mouth has not stopped for the predetermined period of time (No at Step S622), then the system control returns to Step S621. On the other hand, if the application control unit 116 determines that the movement of the mouth has stopped for the predetermined period of time (Yes at Step S622), then the system control proceeds to Step S623.

Meanwhile, in FIG. 21, although it is illustrated that the operations at Steps S621 and S622 are over in only one iteration; in practice, the operations at Steps S621 and S622 are performed in a loop until the condition at Step S202 is satisfied.

The operations performed from Step S623 onward are identical to the operations performed from Step S110 onward illustrated in the flowchart in FIG. 11 according to the first embodiment. That is, at Step S623, the application control unit 116 instructs the SNS application unit 100 to end (turn OFF) the voice input mode. In response to the instruction, the SNS application unit 100 ends the voice input processing performed using the sound processing unit 103, and ends the voice message transmission operation performed using the communication processing unit 102.

Subsequently, at Step S624, the application control unit 116 determines whether or not the next message is received within a predetermined period of time since ending the voice input mode at Step S623. If the application control unit 116 determines that the next message is received (Yes at Step S623), then the system control returns to Step S607.

On the other hand, if the application control unit 116 determines that the next message is not received within the predetermined period of time (No at Step S624), then the system control proceeds to Step S625. At Step S625, the application control unit 116 turns OFF the ranging unit 1004 and the light source unit 1005. When the operation at Step S625 is finished, the sequence of operations illustrated in the flowchart in FIG. 21 is ended.

In this way, in the first modification example of the third embodiment, the ranging unit 1004 and the light source unit 1005 are turned ON in response to a push notification, and the face authentication is performed based on the depth information. Thus, even if a message sent from another terminal device 1a using the corresponding SNS application 5 is received in the display lock state, the user can still release the display lock and send a voice message using the SNS application 5, for example, just by holding the terminal device 1a in one hand and performing face authentication, without having to perform the operation of tapping the touch-sensitive panel 1030 of the terminal device 1a.

Moreover, in the first modification example of the third embodiment, the control for turning OFF the voice input mode is performed according to the result of detecting the movement of the mouth based on the depth information. Hence, voice message transmission can be controlled with higher accuracy.

Furthermore, in the first modification example of the third embodiment, in an identical manner to the second embodiment, the user need not perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Moreover, in the first modification example of the third embodiment, in an identical manner to the second embodiment, as far as turning ON or turning OFF the voice input mode by the SNS application unit 100 is concerned, since the control is performed based on the output of the ToF sensor 1041 for which infrared light is used as the light source, the ON/OFF control of the voice input mode can be performed even in a dark environment such as in the night time.

Furthermore, in the first modification example of the third embodiment, in an identical manner to the second embodiment, the distance to the face is measured at the time when a voice input is performed for sending a voice message. Hence, the sensitivity of the microphone 12 (the gain with respect to the output of the microphone 12) can be adjusted based on the distance to the face. That enables transmission of the voice message with an appropriate sound level.

Second Modification Example of Third Embodiment

Given below is the explanation of a second modification example of the third embodiment. In the first modification example of the third embodiment, a notification about the reception of a message from another terminal device 1a is received by the SNS application 5 in the form of a push notification in the display lock state applied by the OS (the overall control unit 120). Along with that, in an identical manner to the second modification example of the first embodiment, the SNS application unit 100 controls the voice input mode by detecting the movement of the mouth based on a taken image.

Meanwhile, in the second modification example of the third embodiment; regarding the hardware configuration of the terminal device 1a, the configuration of the terminal device 1 explained with reference to FIGS. 6 and 7 according to the first embodiment can be applied without modification.

Figure 22:
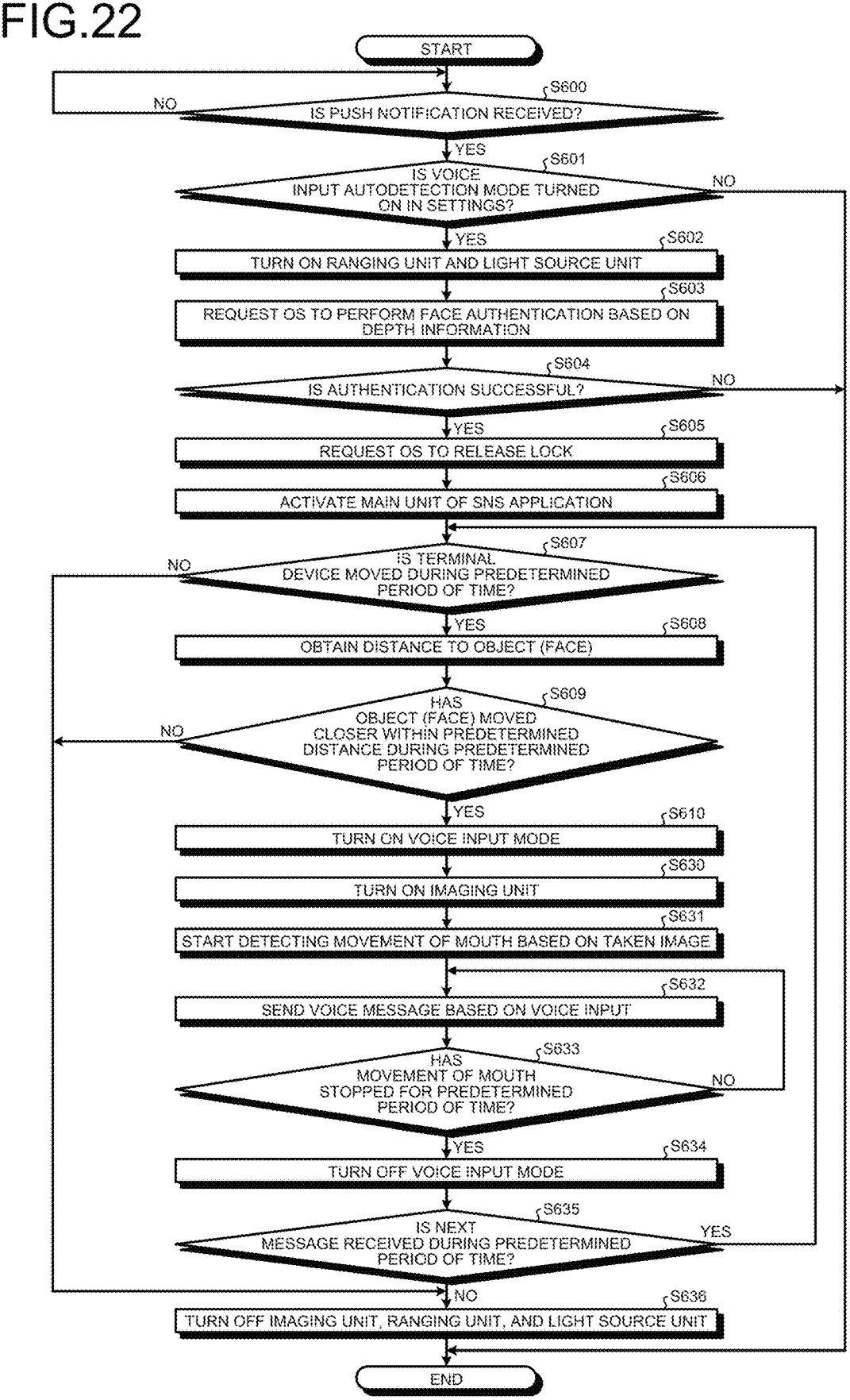
FIG. 22 is an exemplary flowchart for explaining a voice message transmission operation performed in the terminal device according to a second modification example of the third embodiment.

FIG. 22 is an exemplary flowchart for explaining a voice message transmission operation performed in the terminal device 1a according to the second modification example of the third embodiment.

In FIG. 22, the operations identical to the operations illustrated in the flowchart in FIG. 20 are referred to by the same step numbers, and their explanation is given in short. At the start of the operations illustrated in the flowchart in FIG. 22, it is assumed that the switches 1061a, 1061b, and 1062 are in the OFF state. Moreover, in an identical manner to the flowchart illustrated in FIG. 20, prior to the operations illustrated in the flowchart in FIG. 21, in the terminal device 1a, it is assumed that the OS (the overall control unit 120) has locked the display of the display unit 10. Moreover, at that time, it is assumed that the SNS application 5 is not running even in the background.

In FIG. 21, the operations from Step S600 to Step S606 are identical to the operations from Step S600 to Step S606 illustrated in the flowchart in FIG. 20. That is, at Step S600, the activation control unit 117 makes an inquiry to the overall control unit 120 about the presence or absence of a message reception notification in the form of a push notification. If the activation control unit 117 determines according to the result of the inquiry that there is no notification (No at Step S600), then the system control returns to Step S600. On the other hand, if the activation control unit 117 determines according to the result of the inquiry that there is a notification (Yes at Step S600), then the system control proceeds to Step S601. At that time, for example, the overall control unit 120 displays the banner image 16 (see FIG. 15A), which indicates that a message is received, in the display unit 10.

At Step S601, the activation control unit 117 makes an inquiry to the overall control unit 120 about whether or not the voice input autodetection mode is turned ON in the settings. If the activation control unit 117 determines according to the result of the inquiry that the voice input autodetection mode is not turned ON in the settings (No at Step S601), then the sequence of operations illustrated in FIG. 22 is ended.

In that case, under the normal control of the overall control unit 120, for example, as a result of tapping on the position of the banner image 16 displayed in the display unit 10, the overall control unit 120 displays the display lock release screen in the display unit 10. Then, in response to a predetermined display lock release operation, the overall control unit 120 activates the SNS application 5. That enables transmission and reception of messages using the SNS application 5.

On the other hand, if the activation control unit 117 determines according to the result of the inquiry that the voice input autodetection mode is turned ON in the settings (Yes at Step S601), then the system control proceeds to Step S602. At Step S602, the activation control unit 117 turns ON the ranging unit 1004 and the light source unit 1005.

Subsequently, at Step S603, the activation control unit 117 requests the overall control unit 120 to ensure that the authenticating unit 124 performs face authentication based on the depth information obtained by the first face detecting unit 112. In response to that request, the overall control unit 120 performs face authentication based on the depth information.

Then, at Step S604, the activation control unit 117 makes an inquiry to the overall control unit 120 about whether or not the face authentication performed by the authenticating unit 124 was successful. If the activation control unit 117 determines according to the result of the inquiry that the authentication was not successful (No at Step S604), then the sequence of operations illustrated in the flowchart in FIG. 22 is ended. On the other hand, if the activation control unit 117 determines according to the result of the inquiry that the authentication was successful (Yes at Step S604), then the system control proceeds to Step S605.

At Step S605, the activation control unit 117 requests the overall control unit 120 to release the display lock. In response to that request, the overall control unit 120 releases the display lock. Then, at Step S606, the activation control unit 117 activates the main unit of the SNS application 5. The activation of the main unit of the SNS application 5 can be alternatively performed by the overall control unit 120.

The operations performed from Step S607 onward are identical to the operations performed from Step S104 onward illustrated in the flowchart in FIG. 13 according to the second modification example of the first embodiment. That is, at Step S607, the application control unit 116 detects the movement of the terminal device 1a based on the output of the movement estimating unit 115 and determines whether or not the terminal device 1 has been moved during a predetermined period of time since, for example, the point of time of reception of a message at Step S600. If the application control unit 116 determines that the terminal device 1a has not been moved (No at Step S607), then the system control proceeds to Step S636.

On the other hand, the application control unit 116 determines at Step S607 that the terminal device 1a has been moved during the predetermined period of time (Yes at Step S607), then the system control proceeds to Step S608. At Step S608, the application control unit 116 obtains the distance to the object (face) based on the face detection result obtained by the first face detecting unit 112.

Subsequently, at Step S609, based on the distance obtained at Step S608, the application control unit 116 determines whether or not the object (face) has moved closer within a predetermined distance during a predetermined period of time. In an identical manner to the explanation given with reference to FIG. 13; in practice, the operations at Steps S608 and S609 are performed in a loop until the condition at Step S609 is satisfied.

If the application control unit 116 determines at Step S609 that the object (face) has not moved closer within the predetermined distance during the predetermined period of time (No at Step S609), then the system control proceeds to Step S636 and the subsequent operations related to voice message transmission are cancelled.

On the other hand, if the application control unit 116 determines at Step S609 that the object (face) has moved closer within the predetermined distance during the predetermined period of time (Yes at Step S609), then the system control proceeds to Step S610. At Step S610, the application control unit 116 instructs the SNS application unit 100 to turn ON the voice input mode).

The operations performed from Step S630 onward are identical to the operations performed from Step S300 onward illustrated in the flowchart in FIG. 13 according to the second modification example of the first embodiment. That is, at Step S630, the application control unit 116 turns ON the functions of the imaging unit 1003 and starts obtaining a taken image using the imaging processing unit 113. Then, at Step S631, the application control unit 116 instructs the second face detecting unit 114 to start detecting the movement of the mouth in the face using the face detection result that is based on the taken image.

Subsequently, at Step S632, in the SNS application unit 100, the communication processing unit 102 sends the voice data, which is obtained as a result of processing performed by the sound processing unit 103, as a voice message to the sender of the message received at Step S600.

Then, at Step S633, based on the result of mouth movement detection started by the second face detecting unit 114 at Step S631, the application control unit 116 determines whether or not the movement of the mouth has stopped for a predetermined period of time. At Step S633, if the application control unit 116 determines that the movement of the mouth has not stopped for the predetermined period of time (No at Step S633), then the system control returns to Step S632. On the other hand, if the application control unit 116 determines that the movement of the mouth has stopped for the predetermined period of time (Yes at Step S633), then the system control proceeds to Step S634.

In an identical manner to the explanation given with reference to FIG. 13; in practice, the operations at Steps S632 and S633 are performed in a loop until the condition at Step S633 is satisfied.

At Step S634, the application control unit 116 instructs the SNS application unit 100 to end (turn OFF) the voice input mode. In response to that instruction, the SNS application unit 100 ends the voice input processing performed by the sound processing unit 103, and ends the voice message transmission performed by the communication processing unit 102.

Subsequently, at Step S634, the application control unit 116 determines whether or not the next message is received within a predetermined period of time since ending the voice input mode at Step S634. If the application control unit 116 determines that the next message is received (Yes at Step S634), then the system control returns to Step S607.

On the other hand, if the application control unit 116 determines that the next message is not received within the predetermined period of time (No at Step S635), then the system control proceeds to Step S636. At Step S636, the application control unit 116 turns OFF the imaging unit 1003, the ranging unit 1004, and the light source unit 1005. When the operation at Step S636 is finished, the sequence of operations illustrated in the flowchart in FIG. 22 is ended.

In this way, in the second modification example of the third embodiment, the ranging unit 1004 and the light source unit 1005 are turned ON in response to a push notification, and the face authentication is performed based on the depth information. Thus, even if a message sent from another terminal device 1a using the corresponding SNS application 5 is received in the display lock state, the user can still release the display lock and send a voice message using the SNS application 5, for example, just by holding the terminal device 1a in one hand and performing face authentication, without having to perform the operation of tapping the touch-sensitive panel 1030 of the terminal device 1a.

Moreover, in the second modification example of the third embodiment, the control for turning OFF the voice input mode is performed according to the result of detecting the movement of the mouth based on the taken image. Herein, in contrast to the fact that the ToF sensor 1041 obtains the depth information based on the point group information, the image sensor of the imaging unit 1003 can output taken images representing, for example, full-color images taken using RGB colors. Hence, the movement of the mouth can be detected with higher accuracy. Thus, in the second modification example of the third embodiment, voice message transmission can be controlled with higher accuracy than in the first modification example of the third embodiment.

Furthermore, in the second modification example of the third embodiment, in an identical manner to the third embodiment, the user need not perform an operation such as tapping the touch-sensitive panel 1030 of the terminal device 1 in order to turn ON or turn OFF the voice input mode, and can send a voice message, for example, just by holding the terminal device 1 in one hand and moving it closer to the face.

Meanwhile, the effects described in the present written description are only explanatory and exemplary, and are not limited in scope. That is, it is also possible to achieve other effects.

Meanwhile, a configuration as explained below also falls within the technical scope of the application concerned.

(1) A terminal device comprising:
 a microphone;
 a communication unit that performs communication via a network;
 a first sensor that obtains depth information;
 a first face detecting unit that performs first-type face detection for detecting a face and distance to the face based on the depth information; and
 a processor, wherein
 when a communication program, which is meant for making the processor perform transmission and reception of messages including voice messages and which has a sound input mode for enabling collection of sounds using the microphone and transmission of voice messages based on the collected sounds, is executed, and when a message is received by the communication unit under control of the communication program being executed,
 the processor performs the first-type face detection using the first face detecting unit and controls turning ON and turning OFF the sound input mode according to result of the first-type face detection.

(2) The terminal device according to (1), wherein, when the distance detected by the first face detecting unit is shorter than a predetermined distance, the processor performs control to turn ON the sound input mode.

(3) The terminal device according to (1) or (2), wherein, when the distance detected by the first face detecting unit is equal to or greater than a predetermined distance, the processor performs control to turn OFF the sound input mode.

(4) The terminal device according to any one of (1) to (3), further comprising a face authenticating unit that performs authentication based on the face detected by the first face detecting unit, wherein
 when the communication program is executed and when the message is received by the communication unit in a state in which the processor has applied display restriction on display in the terminal device, the processor performs face authentication using the face authenticating unit, and when a face gets authenticated in the face authentication, the processor releases the display restriction.

(5) The terminal device according to any one of (1) to (4), wherein, when the message is received by the communication unit, the processor performs control to turn ON function of the first sensor.

(6) The terminal device according to any one to (1) to (5), further comprising a movement detecting unit that performs movement detection for detecting movement of the terminal device, wherein when a predetermined movement is detected in the movement detection performed by the movement detecting unit, the processor performs the first-type face detection using the first face detecting unit and performs control to turn ON and turn OFF the sound input mode according to result of the first-type face detection.

(7) The terminal device according to (1), further comprising:
a second sensor that obtains image information; and
a second face detecting unit that performs second-type face detection in which a face is detected based on the image information, wherein when the distance detected by the first face detecting unit is shorter than a predetermined distance and when the sound input mode is turned ON, the processor performs the second-type face detection using the second face detecting unit and detects movement of mouth in a face, and when the movement of mouth is not detected for a predetermined period of time, the processor performs control to turn OFF the sound input mode.

(8) The terminal device according to (1), wherein when the distance detected by the first face detecting unit is shorter than a predetermined distance and when the sound input mode is turned ON, the processor detects movement of mouth in the face with respect to which the first face detecting unit performed the first-type face detection, and when the movement of mouth is not detected for a predetermined period of time, the processor performs control to turn OFF the sound input mode.

(9) A terminal device control method comprising:
a depth information obtaining step that includes obtaining depth information using a first sensor;
a first face detection step that includes performing first-type face detection for detecting a face and distance to the face based on the depth information obtained in the depth information obtaining step;
an execution step that includes executing a communication program, which is meant for making a processor perform transmission and reception of messages including voice messages and which has a sound input mode for enabling collection of sounds using a microphone and transmission of voice messages based on the collected sounds;
a determination step that includes determining, by the processor, whether or not a message is received based on the communication program executed in the execution step; and
a control step that, when it is determined in the determination step that the message is received, includes performing the first-type face detection in the first face detection step, and performing control, by the processor, to turn ON and turn OFF the sound input mode according to result of the first-type face detection.

(10) The terminal device control method according to (9), wherein, when the distance detected in the first face detection step is shorter than a predetermined distance, the control step includes performing control to turn ON the sound input mode.

(11) The terminal device control method according to (9) or (10), wherein, when the distance detected in the first face detection step is equal to or greater than a predetermined distance, the control step includes performing control to turn OFF the sound input mode.

(12) The terminal device control method according to any one of (9) to (11), further comprising a face authentication step that performs authentication based on the face detected in the first face detection step, wherein when the communication program is executed and when the message is received by a communication unit, which performs communication via a network, in a state in which the processor has applied display restriction on display in the terminal device, the control step includes performing face authentication in the face authentication step, and when a face gets authenticated in the face authentication, the control step includes releasing the display restriction.

(13) The terminal device control method according to any one to (9) to (12), wherein, when the message is received by a communication unit that performs communication via a network, the control step includes performing control to turn ON function of the first sensor.

(14) The terminal device control method according to any one to (9) to (13), further comprising a movement detection step that includes performing movement detection for detecting movement of the terminal device, wherein when a predetermined movement is detected in the movement detection performed in the movement detection step, the control step includes performing the first-type face detection in the first face detection step and performing control to turn ON and turn OFF the sound input mode according to result of the first-type face detection.

(15) The terminal device control method according to (9), further comprising:
an image information obtaining step that includes obtaining image information using a second sensor; and
a second face detection step that includes performing second-type face detection in which a face is detected based on the image information obtained in the image information obtaining step, wherein when the distance detected in the first face detection step is shorter than a predetermined distance and when the sound input mode is turned ON, the control step includes performing the second-type face detection in the second face detection step and detecting movement of mouth in a face, and when the movement of mouth is not detected for a predetermined period of time, the control step includes performing control to turn OFF the sound input mode.

(16) The terminal device control method according to (9), wherein when the distance detected in the first face detection step is shorter than a predetermined distance and when the sound input mode is turned ON, the control step includes detecting movement of mouth in face with respect to which the first-type face detection was performed in the first face detection step, and when the movement of mouth is not detected for a predetermined period of time, the control step includes performing control to turn OFF the sound input mode.

(17) A computer-readable memory medium that is used to store a control program meant for making a processor execute:

a face detection step that includes performing face detection for detecting a face and distance to the face based on depth information obtained by a sensor;

an execution step that includes executing a communication program, which is meant for making the processor perform transmission and reception of messages including voice messages and which has, as an operation mode at time of being executed in the processor, a sound input mode enabling collection of sounds using a microphone and transmission of voice messages based on the collected sounds;

a determination step that includes determining whether or not a message is received based on the communication program executed in the execution step; and a control step that, when it is determined in the determination step that the message is received, includes performing the face detection in the face detection step, and performing control to turn ON and turn OFF the sound input mode according to result of the face detection.

REFERENCE SIGNS LIST 1 terminal device
2 network
3 server
5 SNS application
10 display unit
12 microphone
13 speaker
14 first sensor
15 second sensor
16 banner image
17 display lock release screen
100 SNS application unit
101 UI unit
102 communication processing unit
103 sound processing unit
110 detection/control unit
111 ranging processing unit
112 first face detecting unit
113 imaging processing unit
114 second face detecting unit
115 movement estimating unit
116 application control unit
117 activation control unit
120 overall control unit
124 authenticating unit
500 driver program
1003 imaging unit
1004 ranging unit
1005 light source unit
1013 orientation detecting unit
1041 ToF sensor
1051 VCSEL

What is claimed is:

1. A terminal device, comprising:
a microphone;
a communication unit that performs communication with another terminal device via a network;
a first sensor that obtains depth information;
a first face detecting unit that performs first-type face detection for detecting a face and distance to the face based on the depth information; and
a processor,
wherein when a communication program, which is meant for making the processor perform transmission and reception of messages including voice messages and which has a sound input mode for enabling collection of sounds using the microphone and transmission of voice messages based on the collected sounds, is executed, and when a message is received from the another terminal device by the communication unit under control of the communication program being executed, the processor performs the first-type face detection using the first face detecting unit and controls turning ON and turning OFF the sound input mode according to a result of the first-type face detection.

2. The terminal device according to claim 1, wherein when the distance detected by the first face detecting unit is shorter than a predetermined distance, the processor performs control to turn ON the sound input mode.

3. The terminal device according to claim 1, wherein when the distance detected by the first face detecting unit is equal to or greater than a predetermined distance, the processor performs control to turn OFF the sound input mode.

4. The terminal device according to claim 1, further comprising a face authenticating unit that performs authentication based on the face detected by the first face detecting unit,
wherein when the communication program is executed and when the message is received by the communication unit in a state in which the processor has applied display restriction on display in the terminal device, the processor performs face authentication using the face authenticating unit, and
wherein when a face gets authenticated in the face authentication, the processor releases the display restriction.

5. The terminal device according to claim 1, wherein when the message is received by the communication unit, the processor performs control to turn ON function of the first sensor.

6. The terminal device according to claim 1, further comprising a movement detecting unit that performs movement detection for detecting movement of the terminal device,
wherein when a predetermined movement is detected in the movement detection performed by the movement detecting unit, the processor performs the first-type face detection using the first face detecting unit and performs control to turn ON and turn OFF the sound input mode according to the result of the first-type face detection.

7. The terminal device according to claim 1, further comprising:
a second sensor that obtains image information; and
a second face detecting unit that performs second-type face detection in which a face is detected based on the image information,
wherein when the distance detected by the first face detecting unit is shorter than a predetermined distance and when the sound input mode is turned ON, the processor performs the second-type face detection using the second face detecting unit and detects movement of mouth in a face, and wherein when the movement of mouth is not detected for a predetermined period of time, the processor performs control to turn OFF the sound input mode.

8. The terminal device according to claim 1, wherein when the distance detected by the first face detecting unit is shorter than a predetermined distance and when the sound input mode is turned ON, the processor detects movement of mouth in the face with respect to which the first face detecting unit performed the first-type face detection, and wherein when the movement of mouth is not detected for a predetermined period of time, the processor performs control to turn OFF the sound input mode.

9. A terminal device control method, comprising:

a depth information obtaining step that includes obtaining depth information using a first sensor;

a first face detection step that includes performing first-type face detection for detecting a face and distance to the face based on the depth information obtained in the depth information obtaining step;

an execution step that includes executing a communication program, which is meant for making a processor perform transmission and reception of messages including voice messages and which has a sound input mode for enabling collection of sounds using a microphone and transmission of voice messages based on the collected sounds;

a determination step that includes determining, by the processor, whether or not a message is received by the terminal device from another terminal device via a network, based on the communication program executed in the execution step; and a control step that, when it is determined in the determination step that the message is received, includes:
performing the first-type face detection in the first face detection step, and
performing control, by the processor, to turn ON and turn OFF the sound input mode according to a result of the first-type face detection.

10. The terminal device control method according to claim 9, wherein when the distance detected in the first face detection step is shorter than a predetermined distance, the control step includes performing control to turn ON the sound input mode.

11. The terminal device control method according to claim 9, wherein when the distance detected in the first face detection step is equal to or greater than a predetermined distance, the control step includes performing control to turn OFF the sound input mode.

12. The terminal device control method according to claim 9, further comprising a face authentication step that performs authentication based on the face detected in the first face detection step, wherein when the communication program is executed and when the message is received by a communication unit, which performs communication via the network, in a state in which the processor has applied display restriction on display in the terminal device, the control step includes performing face authentication in the face authentication step, and wherein when a face gets authenticated in the face authentication, the control step includes releasing the display restriction.

13. The terminal device control method according to claim 9, wherein when the message is received by a communication unit that performs communication via the network, the control step includes performing control to turn ON function of the first sensor.

14. The terminal device control method according to claim 9, further comprising a movement detection step that includes performing movement detection for detecting movement of the terminal device, wherein when a predetermined movement is detected in the movement detection performed in the movement detection step, the control step includes performing the first-type face detection in the first face detection step and performing control to turn ON and turn OFF the sound input mode according to the result of the first-type face detection.

15. The terminal device control method according to claim 9, further comprising:

an image information obtaining step that includes obtaining image information using a second sensor; and a second face detection step that includes performing second-type face detection in which a face is detected based on the image information obtained in the image information obtaining step, wherein when the distance detected in the first face detection step is shorter than a predetermined distance and when the sound input mode is turned ON, the control step includes performing the second-type face detection in the second face detection step and detecting movement of mouth in a face, and wherein when the movement of mouth is not detected for a predetermined period of time, the control step includes performing control to turn OFF the sound input mode.

16. The terminal device control method according to claim 9, wherein when the distance detected in the first face detection step is shorter than a predetermined distance and when the sound input mode is turned ON, the control step includes detecting movement of mouth in face with respect to which the first-type face detection was performed in the first face detection step, and wherein when the movement of mouth is not detected for a predetermined period of time, the control step includes performing control to turn OFF the sound input mode.

17. A non-transitory computer-readable memory medium that is used to store a control program meant for making a processor execute:

a face detection step that includes performing face detection for detecting a face and distance to the face based on depth information obtained by a sensor;

an execution step that includes executing a communication program, which is meant for making the processor perform transmission and reception of messages including voice messages and which has, as an operation mode at time of being executed in the processor, a sound input mode enabling collection of sounds using a microphone and transmission of voice messages based on the collected sounds;

a determination step that includes determining whether or not a message is received by a terminal device from another terminal device via a network, based on the communication program executed in the execution step; and a control step that, when it is determined in the determination step that the message is received, includes:
performing the face detection in the face detection step, and performing control to turn ON and turn OFF the sound input mode according to a result of the face detection.

18. The non-transitory computer-readable memory medium according to claim 17, wherein when the distance detected in the face detection step is shorter than a predetermined distance, the control step includes performing control to turn ON the sound input mode.

19. The non-transitory computer-readable memory medium according to claim 17, wherein when the distance detected in the face detection step is equal to or greater than a predetermined distance, the control step includes performing control to turn OFF the sound input mode.

20. The non-transitory computer-readable memory medium according to claim 17, wherein when the message is received by a communication unit of the terminal device that performs communication via the network, the control step includes performing control to turn ON function of the sensor.

* * * * *